(12) United States Patent
Shiokawa et al.

(10) Patent No.: US 7,684,334 B2
(45) Date of Patent: Mar. 23, 2010

(54) METHOD OF CALL PROCESSING AT COMMUNICATION NODE

(75) Inventors: Hiroshi Shiokawa, Fukuoka (JP); Kazuhiro Nakashima, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 1139 days.

(21) Appl. No.: 10/195,599

(22) Filed: Jun. 26, 2002

(65) Prior Publication Data

US 2002/0172152 A1 Nov. 21, 2002

Related U.S. Application Data

(63) Continuation of application No. PCT/JP00/00056, filed on Jan. 11, 2000.

(51) Int. Cl.
H04J 3/16 (2006.01)
H04L 12/28 (2006.01)
H04W 4/00 (2009.01)

(52) U.S. Cl. .................. 370/236; 370/395.21; 370/341; 709/226

(58) Field of Classification Search ........................ None
See application file for complete search history.

(56) References Cited

U.S. PATENT DOCUMENTS

| | | | |
|---|---|---|---|
| 5,444,699 A | | 8/1995 | Watanabe |
| 6,058,422 A * | | 5/2000 | Ayanoglu et al. ............ 709/226 |
| 6,230,200 B1 * | | 5/2001 | Forecast et al. ............. 709/226 |
| 6,336,129 B1 * | | 1/2002 | Ise et al. ...................... 709/201 |
| 6,510,157 B2 * | | 1/2003 | Kwok et al. ............. 370/395.2 |
| 6,996,067 B1 * | | 2/2006 | Burke et al. ................. 370/248 |
| 7,009,936 B1 * | | 3/2006 | Kangas et al. ............... 370/229 |
| 7,023,825 B1 * | | 4/2006 | Haumont et al. ............ 370/338 |
| 2002/0089958 A1 * | | 7/2002 | Feder et al. ................. 370/338 |

FOREIGN PATENT DOCUMENTS

JP 3-220847 9/1991

(Continued)

OTHER PUBLICATIONS

Notification of Reasons for Refusal mailed Jul. 18, 2006.
International Search Report dated Apr. 25, 2000 for corresponding International Application No: PCT/JP00/00056.

(Continued)

*Primary Examiner*—Gregory B Sefcheck
(74) *Attorney, Agent, or Firm*—Katten Muchin Rosenman LLP

(57) ABSTRACT

In a method of processing a call in response to a connection request that includes reported bandwidths in both upstream and downstream directions, a communication node on the calling side (1) manages available bandwidths in upstream and downstream directions on a per-path basis; (2) searches for a path having upstream/downstream available bandwidths, which are greater than the upstream/downstream reported bandwidths; (3) if such a path can be found, accepts the call connection request as a call communicated in both directions on this path; (4) if such a path cannot be found, searches independently for a path having an available bandwidth greater than the upstream reported bandwidth and a path having an available bandwidth greater than the downstream reported bandwidth; and (5) if these two paths can be found, accepts the call connection request as a call communicated on the separate paths on a per-upstream- and downstream-direction basis.

8 Claims, 32 Drawing Sheets

FOREIGN PATENT DOCUMENTS

| | | |
|---|---|---|
| JP | 5-268252 | 10/1993 |
| JP | 5268252 | 10/1993 |
| JP | 9-83546 | 3/1997 |
| JP | 9-130388 | 5/1997 |

OTHER PUBLICATIONS

International Preliminary Examination Report dated Oct. 18, 2000 for corresponding International Application No. PCT/JP00/00056.

* cited by examiner

FIG. 21

SET UP MESSAGE

| INFORMATION ELEMENT |
| --- |
| PROTOCOL DISCRIMINATOR |
| CALL REFERENCE |
| MESSAGE TYPE |
| MESSAGE LENGTH |
| AAL PARAMETERS |
| ATM TRAFFIC DESCRIPTOR |
| BROADBAND BEARER CAPABILITY |
| BROADBAND HIGH LAYER INFORMATION |
| BROADBAND REPEAT INDICATOR |
| BROADBAND LOW LAYER INFORMATION |
| CALLED PARTY NUMBER |
| CALLED PARTY SUBADDRESS |
| CALLING PARTY NUMBER |
| CALLING PARTY SUBADDRESS |
| CONNECTION IDENTIFIER |
| QOS PARAMETER |
| BROADBAND SENDING COMPLETE |
| TRANSIT NETWORK SELECTION |
| ENDPOINT REFERENCE |

METHOD OF CALL PROCESSING AT COMMUNICATION NODE

CROSS-REFERENCE TO THE RELATED APPLICATION

This application is a continuation of International Application No.: PCT/JP00/00056 which was filed on Jan. 11, 2000, the contents of which are herein incorporated by reference

BACKGROUND OF THE INVENTION

This invention relates to a method of call processing at a communication node. More particularly, the invention relates to a method of call processing at a communication node in which, when the bandwidth of a path (line) between communication nodes undergoes upstream and downstream management separately and a call connection request that includes upstream/downstream reported bandwidths is issued, makes it possible to accept the call upon making the path for upstream communication and that for downstream communication different from each other.

In multimedia communications, there are many cases where communication speeds in the upstream and downstream directions differ, or in other words, where the necessary bandwidths in the upstream and downstream directions differ. In such cases, the conventional practice is to reserve the same bandwidth for the upstream and downstream directions on one path, as in the manner of telephone communications. That is, by reserving the bandwidth for whichever of the upstream or downstream direction requires the larger bandwidth, the bandwidths in both the upstream and downstream directions are assured. With this method, however, bandwidth that is not actually used also is reserved as necessary bandwidth. As a consequence, there is a decline in the efficiency with which the trunk circuit connecting communication nodes is used. Economy is sacrificed as a result.

Accordingly, a technique has been proposed (see the specification of Japanese Patent Application Laid-Open No. 61-56542) in which a connection request only in the upstream direction or a connection request only in the downstream direction is handled independently, thereby eliminating waste of upstream/downstream line bandwidth so that bandwidth will be utilized effectively. However, such prior art cannot deal with a call connection request that includes reported bandwidths in both the upstream and downstream directions. As a consequence, this technique cannot be applied to call admission control in which a call connection request includes reported bandwidths in both the upstream and downstream directions, as is the case in an ATM (Asynchronous Transfer Mode) network.

Accordingly, consideration has been given to a method that includes (1) managing the bandwidth of each path (line) separately in upstream and downstream directions; (2) when a call connection request that includes upstream/downstream reported bandwidths is issued, obtaining paths (lines) that satisfy respective ones of the reported bandwidths; (3) reserving bandwidth for each direction in each reported bandwidth; and (4) performing upstream and downstream communication via the paths obtained.

FIG. 32 is a schematic view showing the configuration of a communication system for implementing such method. Numeral 1 denotes an ATM exchange on the calling side, 2 an ATM exchange on the called side, 3 and 4 terminals, and 5 and 6 trunk circuits (paths) connecting the ATM exchanges. The ATM exchange 1 includes a call controller 1a for performing call control; a path-selection information storage unit 1b for storing upstream available bandwidth, downstream available bandwidth and line status of each path; an outgoing-path management unit 1c for referring to the path-selection information to determine whether a path satisfies upstream/downstream reported bandwidths; and a failure management unit 1d for detecting line (path) failure and notifying the call controller. The ATM exchange 2 also has a structure identical with that of the ATM exchange 1 and only a call controller 2a is illustrated.

The call controller 1a decides the outgoing path by a path selection protocol PNNI in response to a dynamic call connection request of an SVC (Switched Virtual Connection) or SPVC (Soft Permanent Virtual Connection), etc. The call controller 1a then queries the outgoing-path management unit 1c as to whether the upstream/downstream available bandwidths of the decided outgoing path are equal to or greater than the respective upstream/downstream reported bandwidths in the call connection request. The outgoing-path management unit 1c refers to the call selection information, determines whether the upstream/downstream available bandwidths of the outgoing path are equal to or greater than the respective upstream/downstream reported bandwidths in the call connection request and notifies the call controller 1a of the result. If the upstream/downstream available bandwidths of the outgoing path are both equal to or greater than the upstream/downstream reported bandwidths, the call controller 1a accepts the call connection request and transmits a call-connection request message (setup message) to the ATM exchange on the called side. Further, the outgoing-path management unit 1c updates the upstream/downstream available bandwidths of the above-mentioned path in the path-selection information storage unit 1b. On the other hand, if either of the available bandwidths is less than the reported bandwidth, the call controller 1a refuses call admission and does not transmit the call-connection request message to the ATM exchange on the called side. In other words, the call-connection request message is not transmitted unless the bandwidths in both directions are satisfied on the same line, even if there is available bandwidth that satisfies either the upstream bandwidth or downstream bandwidth of the connection (SVC or SPVC).

FIG. 33 is a diagram useful in describing the call admission operation. In a case where the upstream/downstream maximum bandwidth is 156 Mbps (written simply as 156M below), (1) indicates that 100M/100M are used in communication between terminals $3_1$, $4_1$ as the upstream/downstream bandwidths of a path 5 and that the upstream/downstream available bandwidths are 56M/56M, and (2) indicates that 110M/50M are used in communication between terminals $3_3$, $4_3$ as the upstream/downstream bandwidths of a path 6 and that the upstream/downstream available bandwidths are 46M/106M. If a call connection request in which the upstream/downstream reported bandwidths are 50M/80M, respectively, is issued between terminals $3_2$ and $4_2$ under these conditions, the upstream available bandwidth of 56M in case of path 5 will be greater than the upstream reported bandwidth of 50M but the downstream available bandwidth of 56M will be less than the downstream reported bandwidth of 80M. Further, the downstream available bandwidth of 106M in case of path 6 will be greater than the downstream reported bandwidth of 80M but the upstream available bandwidth of 46M will be less than the upstream reported bandwidth of 50M. As a consequence, the call connection request of upstream/downstream reported bandwidths 50M/80M is refused.

An arrangement in which the upstream/downstream reported bandwidths are allocated to separate paths on a persingle-direction basis when a call connection request is issued does not exist in the prior art. Consequently, there will be many cases where a path that satisfies both the upstream/downstream bandwidths does not exist. The end result is that it is necessary to add on physical lines per se. Further, in the cases mentioned above, much wasted available bandwidth that cannot be utilized in a trunk circuit is produced.

SUMMARY OF THE INVENTION

Accordingly, an object of the present invention is to make it possible to accept a call connection request on separate paths on a per-single-direction basis with regard to a dynamic bidirectional connection request of an SVC or SPVC, etc., whereby available bandwidth is utilized effectively.

In the present invention, each communication node (1) manages available bandwidths in upstream and downstream directions on a per-path basis; (2) when a call connection request that includes reported bandwidths in both upstream and downstream directions is issued, searches for a path having upstream/downstream available bandwidths that are greater than the upstream/downstream reported bandwidths; (3) if such a path can be found, accepts the call connection request as a call communicated in both directions on this path; (4) if such a path cannot be found, searches independently for a path having an available bandwidth greater than the upstream reported bandwidth and a path having an available bandwidth greater than the downstream reported bandwidth; and (5) if these two paths can be found, accepts the call connection request as a call communicated on the separate paths (namely as a split-path call) on a per-upstream- and downstream-direction basis. If this arrangement is adopted, it is possible to accept a call connection request for separate paths on a per-single-direction basis with regard to a dynamic bidirectional connection request of an SVC or SPVC, etc., whereby available bandwidth is utilized effectively.

In a case where a call connection request has been accepted as a split-path call, (1) a calling node creates a call-connection request message, which is transmitted to a called node, on a per-upstream/downstream-path basis and (2) transmits each of the call-connection request messages to the called node via the upstream and downstream paths; and (3) the called node creates a call-connection request message, which is reported to a destination terminal, when the call-connection request messages of the split-path call are received from each of the paths. Further, when a split-path call answer message is received from the destination terminal, (1) the called node creates an answer message transmitted from the called node to the calling node on a per-path basis and (2) transmits the answer messages to the calling node via the upstream and downstream paths; and (3) the calling node creates an answer message, which is reported to an originating terminal, when the split-path call answer messages are received from each of the paths. Furthermore, when a split-path call release message is received from a terminal, (1) one of the calling node and called node creates a release request message transmitted to the other node on a per-path basis and transmits the release request messages to the other node via the upstream and downstream paths, and (2) the other node creates a release request message reported to a terminal when the split-path call release request messages are received from each of the paths.

If this arrangement is adopted, it is possible for a terminal to send and receive call-connection request messages, send and receive answer messages and send and receive release request messages without being aware of whether a call has been accepted as a split-path call.

Further, in the present invention, when a failure occurs on an upstream path or downstream path during communication on separate paths on a per-upstream- and downstream-direction basis, (1) the calling and called nodes release the connection on the path where the failure occurred; (2) then the calling node searches for a separate path having an available bandwidth that is greater than a reported bandwidth that has been allocated to the released path; (3) if such a path can be found, a reconnect call-connection request message is created and is transmitted from the calling node to the called node via this separate path; (4) when the reconnect call-connection request message has been received by the called node, the latter sets up a path between the separate path and the destination terminal and transmits an answer message to the calling node; and (5) the calling node sets up a path between the originating terminal and the separate path in response to receipt of the answer message. This arrangement is such that if either of the paths (trunk circuits) in the upstream/downstream directions fails in a split-path call in which the upstream/downstream directions are established on different paths, communication is continued via the normal path and a reconnection is made to the other path while this communication is maintained.

BRIEF DESCRIPTION OF THE DRAWINGS

FIG. 21 is a diagram useful in describing a setup message;

DESCRIPTION OF THE PREFERRED EMBODIMENT

(A) ATM Exchange

Figure 1:
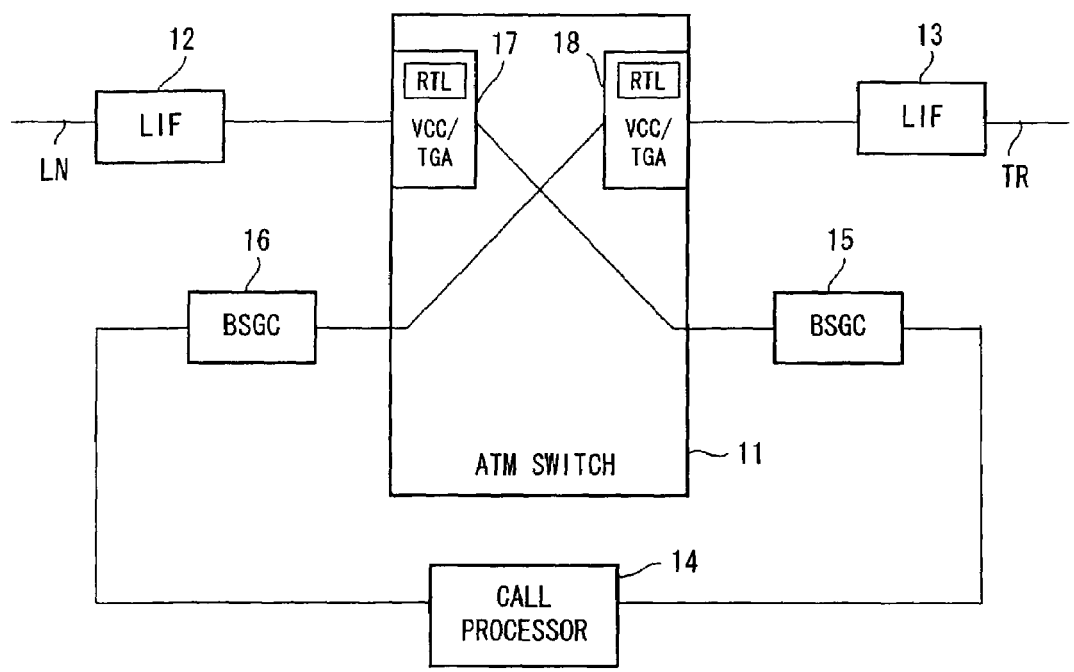
FIG. 1 is a block diagram of an ATM exchange.

FIG. 1 is an overall block diagram of an ATM exchange.

Numeral 11 denotes an ATM switch for switching a cell that has arrived from a prescribed incoming line to a prescribed outgoing line based upon a VCI/VPI contained in the header of the cell; 12 a line interface connected to a terminal; 13 a line interface connected to a network (trunk circuit); 14 a call processor for performing call processing control based upon a call connect/disconnect request; and 15, 16 signaling units (BSGC) each provided between the call processor 14 and the ATM switch 11. The signaling units 15, 16 have (1) a CLAD (Cell Assembly and Disassembly) function for disassembling (de-celling) a call-process cell, which enters from an ATM switch, into data that the call processor 14 can handle, and assembling call-process data, which is sent from the call processor to a prescribed terminal or neighboring exchange, into cells, and (2) an ATM interface function which, in order to send an assembled call-process cell to a prescribed terminal or neighboring ATM exchange, attaches a VPI/VCI or tag information to this cell and inputs the cell to the ATM switch.

The ATM switch 11 has header converting/tag attaching units (VCC/TGA) 17, 18 in addition to the switching portion. The header converting/tag attaching units (VCC/TGA) 17, 18 each has a routing table RTL in which (1) routing information for routing a call-process cell to the signaling units 15, 16 and (2) routing information for routing a data cell to a prescribed path are set. The VPI/VCI value that is attached to a call-process cell that a terminal or ATM exchange transmits is a value specific to each terminal or ATM exchange. Accordingly, the call processor 14 creates routing information, which is for routing call-process cells to the signaling units 15, 16, and sets this information in the routing tables RTL beforehand in association with the VPI/VCI values. Further, the call processor 14 creates routing information, which is for routing data cells to a prescribed outgoing path, on a per-call basis and sets this information in the routing tables RTL.

Thus, when a call is processed, the ATM switch 11 routes a call-process cell, which enters from a terminal or neighboring ATM exchange, to the signaling units 15, 16 by referring to the routing tables, and inputs the cell to the call processor 14 via the signaling units. Further, the ATM switch 11 routes a call-process cell, which enters from the call processor 14 via the signaling units 15, 16, to a prescribed terminal or neighboring ATM exchange. When communication is performed, the ATM switch 11 refers to the routing tables RTL and routes an entered data cell to an outgoing line that conforms to a prescribed destination.

(B) Functional Block Structure of Call Processor

Figure 2:
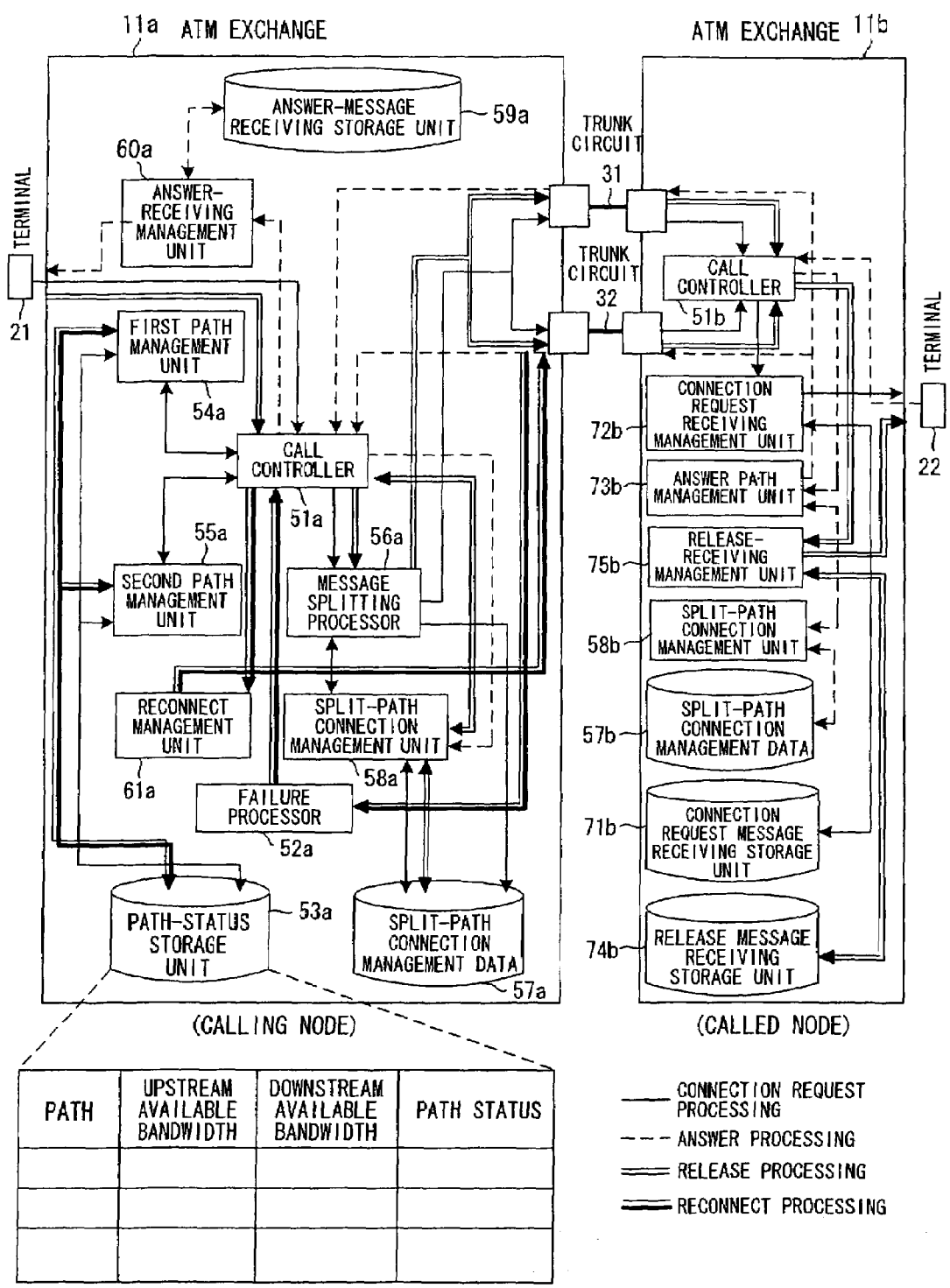
FIG. 2 is a functional block diagram of a call processor according to the present invention.

FIG. 2 is a functional block diagram of a call processor according to the present invention. Shown in FIG. 2 are an ATM exchange (calling node) 11a on the calling side, an ATM exchange (called node) 11b on the called side, an originating terminal 21, a destination terminal 22, and trunk circuits (paths) 31, 32 connecting these ATM exchanges, whereby two transmission paths, namely upstream and downstream paths, are provided. Units belonging to the calling node 11a will be described below upon attaching the suffix "a" to the reference numerals thereof, and units belonging to the called node 11b will be described below upon attaching the suffix "b" to the reference numerals thereof. The calling node 11a and called node 11b are identically constructed. Portions that are unnecessary in terms of explanation are deleted from FIG. 2.

At the nodes 11a, 11b, call controllers 51a, 51b respond to a dynamic call connection request (a call connection request that requires bandwidths in both upstream and downstream directions) of an SVC/SPVC, etc., by performing overall control from connection to release of the call. A failure management unit 52a monitors the status (faulty or normal) of the trunk circuits 31, 32, detects failure and reports this to the call controller 51a. A path-status storage unit 53a stores upstream available bandwidth, downstream available bandwidth and line status of each path.

When a call connection request has been generated, a first path management unit 54a selects paths by a path selection protocol PNNI based upon the destination, then refers to the status of each selected path to determine whether the path satisfies the upstream/downstream reported bandwidths, and reports the result to the call controller 51a. In other words, the first path management unit determines whether the upstream/downstream available bandwidths (usable bandwidths) of the paths selected by the path selection protocol PNNI are both greater than the upstream/downstream available bandwidths and reports the result to the call controller 51a.

When a path that satisfies the upstream/downstream reported bandwidths does not exist, a second path management unit 55a searches the paths, which have been selected by the path selection protocol PNNI, independently for a path having an available bandwidth greater than the upstream reported bandwidth and a path having an available bandwidth greater than the downstream reported bandwidth, and reports the result of the search to the call controller 51a. Even though a path satisfying the reported bandwidths in both the upstream/downstream directions does not exist, the call controller 51a accepts the connection request call as a call communicated on separate upstream and downstream paths (namely as a split-path call) if a path (trunk circuit) that satisfies the upstream reported bandwidth and a separate path (trunk circuit) that satisfies the downstream reported bandwidth exist.

When a connection request call is accepted as a split-path call, a message splitting processor 56a splits a connection request message (setup message), which is received from the terminal 21, into an upstream-path connection request message and a downstream-path connection request message, maps each of these messages to the payload of a call-process cell and transmits the cells to the called ATM exchange 11b via the upstream path 31/downstream path 32.

Split-path connection management data storage units 57a, 57b store connection management data of split-path calls. The following items are stored in association with a call number (call reference) of a split-path call:

(1) upstream connection ID (VPI/VCI);
(2) downstream connection ID (VPI/VCI);
(3) upstream path number; and
(4) downstream path number.

The upstream connection ID and downstream connection ID are VPI/VCIs attached to the headers of upstream and downstream data cells when these cells are transmitted.

Split-path connection management units 58a, 58b perform management such as writing, deleting and altering the connection management data in the storage units 57a, 57b.

An answer-message receiving storage unit 59a stores the received state of an answer message (connect message) corresponding to a split connection request message. If an answer message corresponding to a split connection request message is received from the called node 11b, an answer-receiving management unit 60a stores this fact in the storage unit 59a. If answer messages are received from both the upstream path 31 and downstream path 32, the answer-receiving management unit 60a creates an answer message with respect to the calling terminal 21 and communicates the same.

When the upstream path 31 or downstream path 32 is severed owing to a failure, a reconnect management unit 61a retrieves the other path and issues a reconnect request.

A connection request message receiving storage unit 71b of the called node 11b stores the received state of each connection request message split and sent from the calling node 11a via the upstream path 31 and downstream path 32. If connection request messages split and sent from the upstream path 31 and downstream path 32 are received, a connection request receiving management unit 72b stores this fact in a storage unit 71b. When connection request messages are received form both paths, the connection request receiving management unit 72b creates a connection request message transmitted to the destination terminal 22.

If an answer message is received from the destination terminal 22, an answer path management unit 73b creates an answer message in response to the connection request message from the upstream path 31 and an answer message in response to the connection request message from the downstream path 32, maps each of these answer messages to the payload of a call-process cell and transmits the cells to the calling node 11a via the upstream path 31/downstream path 32.

A release message receiving storage unit 74b stores the received states of release messages split and sent from the calling node 11a via the upstream path 31 and downstream path 32. If release messages split and sent from the upstream path 31 and downstream path 32 are received, a release receiving management unit 75b stores this fact in a storage unit 74b. When release messages are received from both paths, the release receiving management unit 75b creates a release message transmitted to the destination terminal 22.

Figure 3:
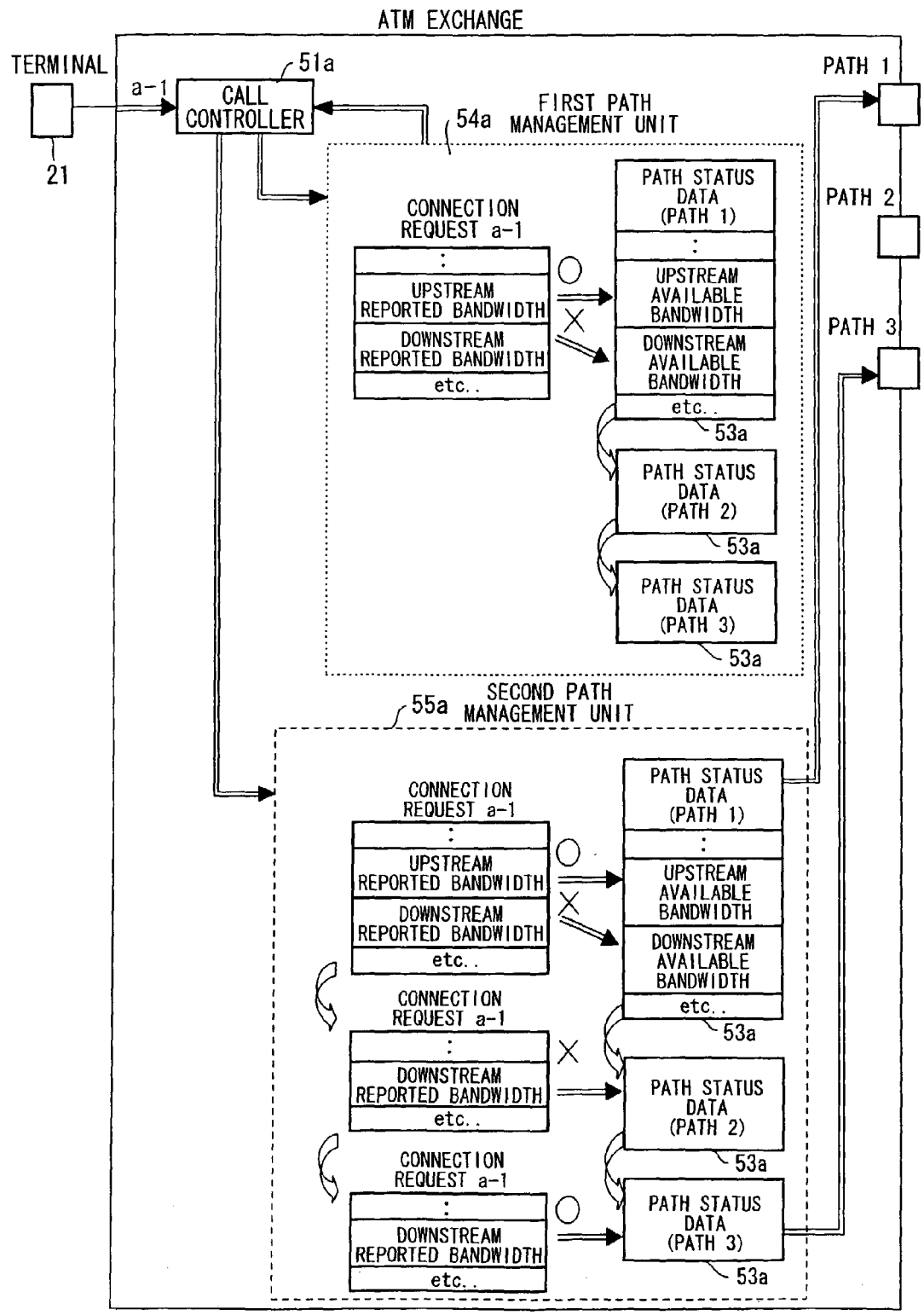
FIG. 3 is a diagram useful in describing call admission control.
Figure 4:
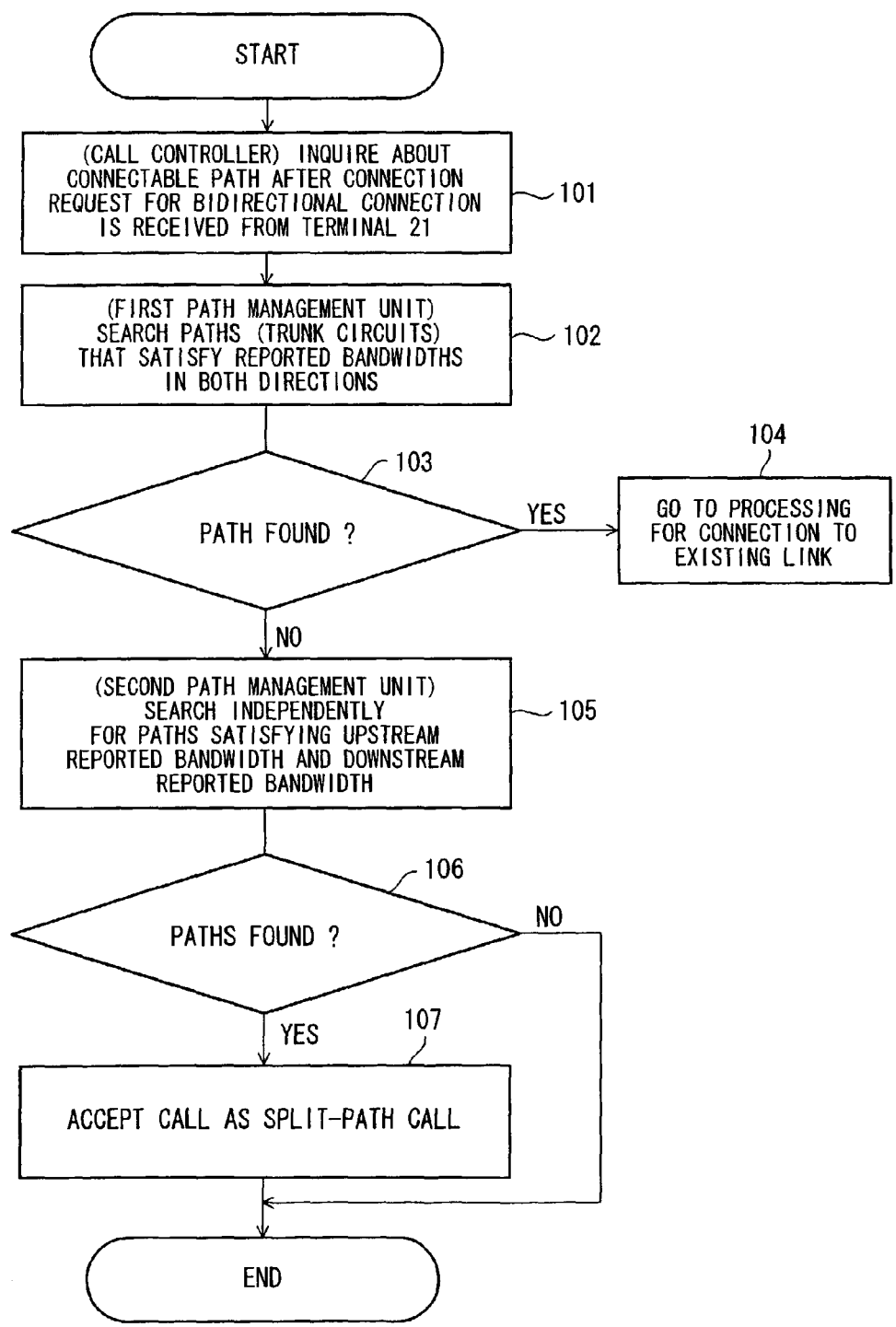
FIG. 4 is a flowchart of processing of call admission control according to the present invention.

(C) Call Processing Control According to the Present Invention (a) Call Admission Control FIG. 3 is a diagram useful in describing call admission control, and FIG. 4 is a flowchart of processing of call admission control according to the present invention. Components in FIG. 3 identical with those shown in FIG. 2 are designated by like reference characters.

If a connection request message (connection request call) a-1 having an upstream reported bandwidth and a downstream reported bandwidth is received from the terminal 21, the call controller 51a queries the first path management unit 54a with regard to a path that satisfies both the upstream reported bandwidth and the downstream reported bandwidth of the connection request call a-1 (step 101).

The first path management unit 54a searches paths 1 to 3, which conform to the destination, by the path selection protocol PNNI, and then refers to the path-status data in the path-status storage unit 53a to determine whether the paths 1 to 3 satisfy both of the upstream/downstream reported bandwidths of the connection request call a-1 (step 102). If any of the paths satisfies both of the upstream/downstream reported bandwidths of the connection request call a-1 (step 103), then the first path management unit 54a accepts the connection request call a-1 and allocates it to this path by processing for connection to the existing link (step 104).

If, however, none of these paths satisfies both of the upstream/downstream reported bandwidths of the connection request call a-1, then the call controller 51a queries the second management unit 55a separately with regard to a path that satisfies the upstream reported bandwidth and a path that satisfies the downstream reported bandwidth of the connection request call a-1. The second path management unit 55a searches the paths 1 to 3, which were retrieved by the path selection protocol PNNI, independently for a path having an available bandwidth equal to or greater than the upstream reported bandwidth and a path having an available bandwidth equal to or greater than the downstream reported bandwidth, and reports the result to the call controller 51a (step 105).

The call controller 51a refers to the report from the second path management unit 55a and checks to determine whether a path having an available bandwidth equal to or greater than the upstream reported bandwidth and a separate path having an available bandwidth equal to or greater than the downstream reported bandwidth could be found (step 106). If these paths could be found, the call controller 51a accepts the connection request call a-1 as a split-path call and allocates the upstream reported bandwidth and downstream reported bandwidth to respective ones of the paths (step 107).

If neither a path having an available bandwidth equal to or greater than the upstream reported bandwidth nor a path having an available bandwidth equal to or greater than the downstream reported bandwidth could be selected at step 106, then the connection request is refused.

FIG. 3 illustrates a situation in which, when a trunk circuit satisfying both the upstream/downstream reported bandwidths does not exist, path 1 satisfies the upstream reported bandwidth and path 3 satisfies the downstream reported bandwidth.

Thus, even though a path that satisfies the reported bandwidths in both the upstream/downstream directions does not exist, the call controller 51a accepts the connection request call a-1 as a split-path call if a path (trunk circuit) that satisfies the upstream reported bandwidth and a separate path (trunk circuit) that satisfies the downstream reported bandwidth exist, and allocates the upstream reported bandwidth and downstream reported bandwidth to respective ones of the paths.

If this arrangement is adopted, it becomes possible to accept a call connection request which heretofore would have been refused owing to insufficient available bandwidth, and a network architecture that uses the bandwidth of an ATM trunk circuit efficiently can be realized.

(b) Sending and Receiving of Call-Connection Request Message

Figure 5:
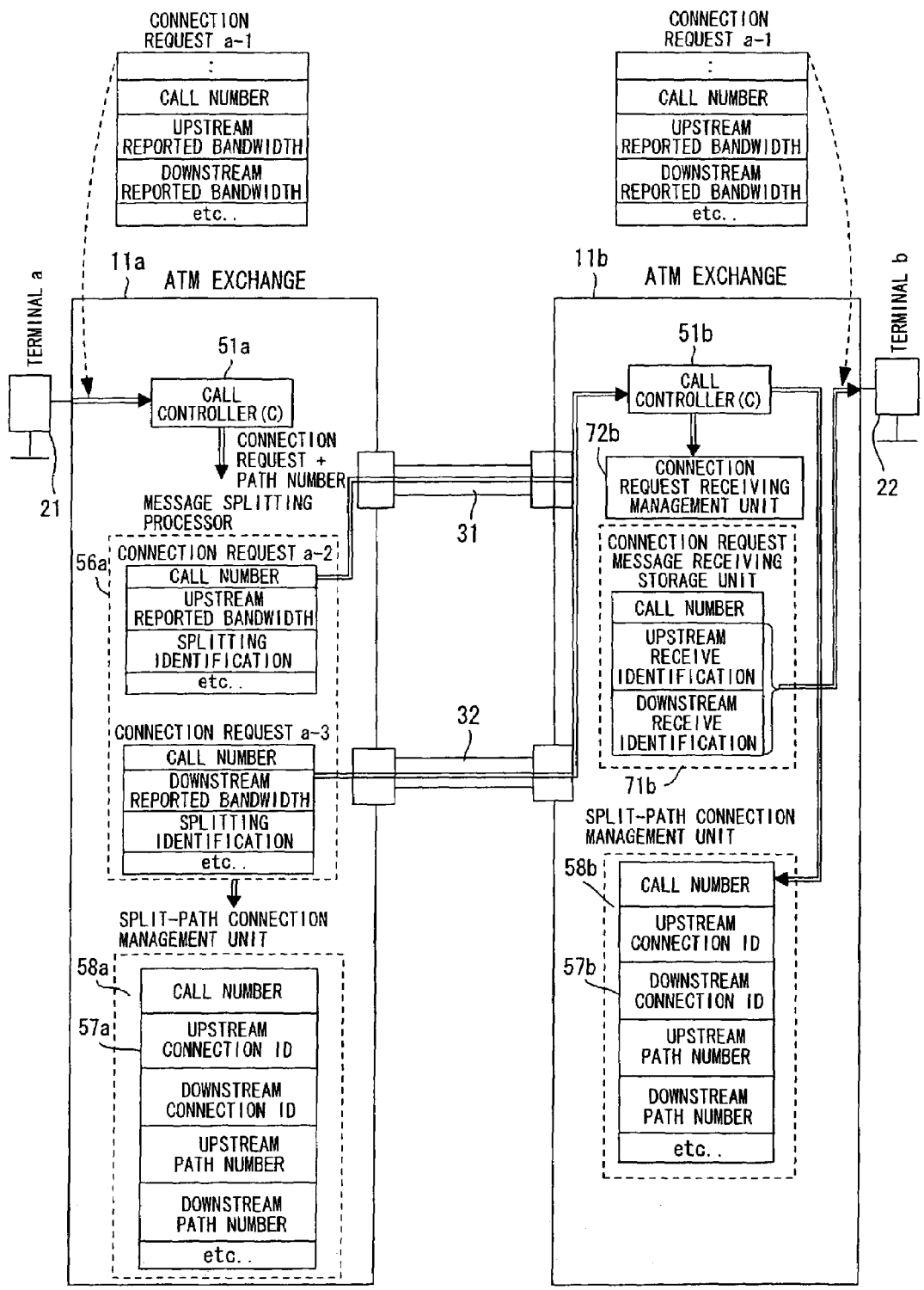
FIG. 5 is a diagram useful in describing control for sending and receiving a call-connection request message of a split-path call.
Figure 6:
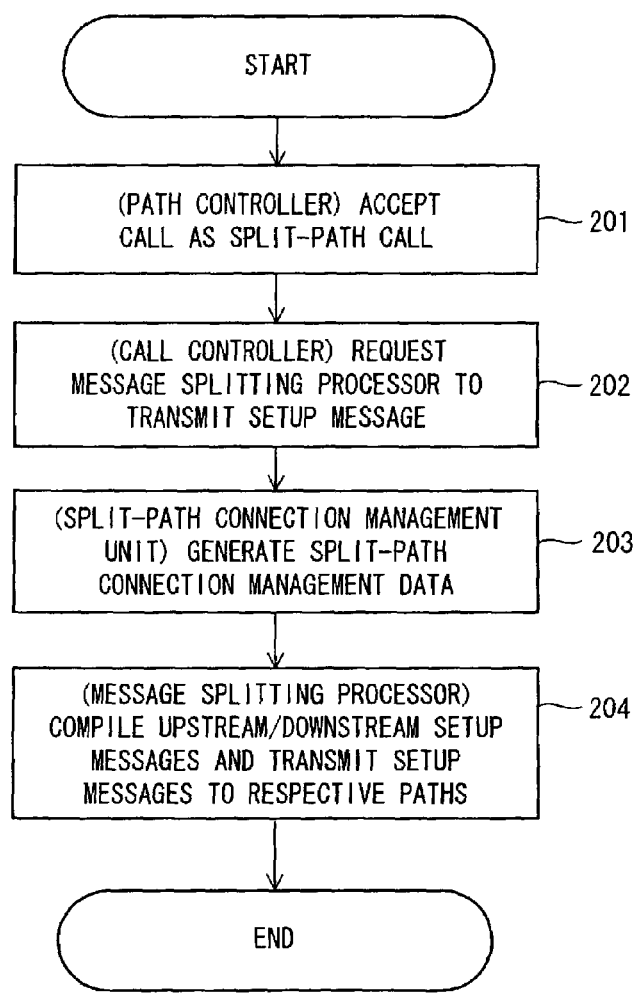
FIG. 6 is a flowchart of processing for transmitting a call-connection request message at a calling node.
Figure 7:
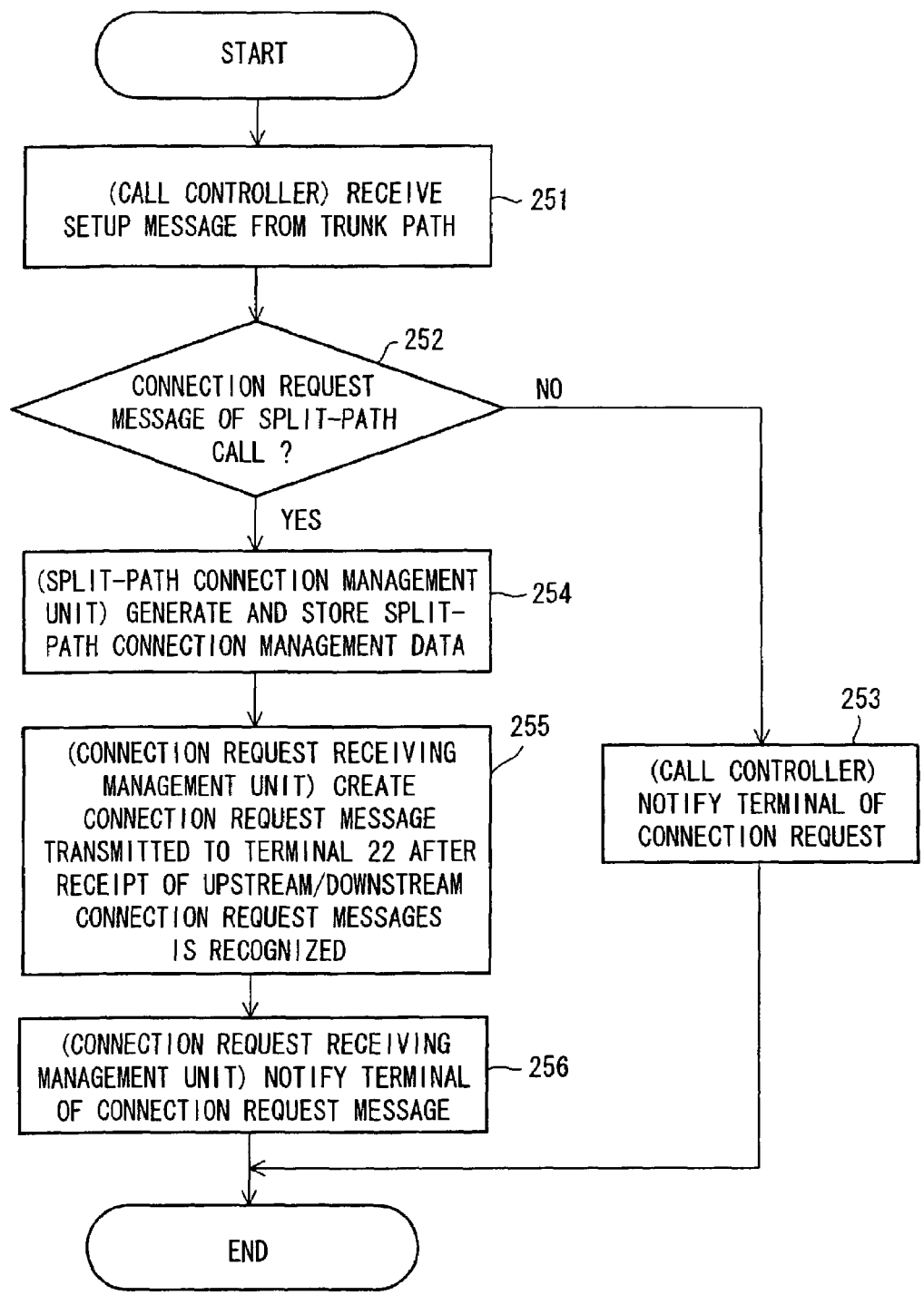
FIG. 7 is a flowchart of processing for receiving a call-connection request message at a called node.

FIG. 5 is a diagram useful in describing control for sending and receiving a call-connection request message of a split-path call, FIG. 6 is a flowchart of processing for transmitting a call-connection request message at a calling node, and FIG. 7 is a flowchart of processing for receiving a call-connection request message at a called node. Components in FIG. 5 identical with those shown in FIG. 2 are designated by like reference characters.

Upon receiving the connection request call a-1, which has upstream and downstream reported bandwidths, as a split-path call from the terminal 21 (step 201), the call controller 51a requests the message splitting processor 56a to transmit a call request message (setup message) via each path (step 202). When transmission of the above-mentioned message is requested, the call controller 51a delivers the connection request call a-1 and the upstream and downstream path numbers to the message splitting processor 56a. The upstream path is the trunk circuit 31 and the downstream path is the trunk circuit 32.

The message splitting processor 56a that has received the transmission request instructs the split-path connection management unit 58a to create split-path connection management data. In response, the split-path connection management unit 58a creates the split-path connection management data and stores this data in the storage unit 57a (step 203). The split-path connection management data is composed of (1) a call number, (2) an upstream connection ID (VPI/VCI), (3) a downstream connection ID (VPI/VCI), (4) an upstream path number and (5) a downstream path number, etc.

The message splitting processor 56a compiles a connection request message a-2 for the upstream bandwidth and a connection request message a-3 for the downstream bandwidth, maps each of these connection request messages a-2, a-3 to the payload of a call-process cell and transmits the cells to the called node 11b via the upstream path 31 and downstream path 32 (step 204).

The connection request messages a-2, a-3 for the upstream and downstream bandwidths both have the same reference number (call reference) and include split identifying data indicating the fact that splitting has taken place. Further, the connection request message a-2 for the upstream bandwidth includes the upstream reported bandwidth and a VPI/VCI attached to the upstream data cell. The connection request message a-3 for the downstream bandwidth includes the downstream reported bandwidth and a VPI/VCI attached to the downstream data cell.

If the call controller 51b of the called node 11b receives a connection request message (step 251), the call controller 51b determines whether the received message is a connection request message for a split-path call based upon whether or not split identifying data is present or not (step 252).

If the received message is not a connection request message for a split-path call, the call controller 51b reports this connection request message to the terminal 22 immediately (step 253).

If the received message is a connection request message for a split-path call, on the other hand, the call controller 51b (1) renders an upstream or downstream decision from the information elements contained in the message (it is assumed here that this is the connection request message a-2 for the upstream bandwidth) and (2) reports the call number, upstream connection ID (VPI/VCI) and the path number of the message receive path, which are contained in the message a-2, to the split-path connection management unit 58b and instructs the split-path connection management unit 58b to create split-path connection management data. In response, the split-path connection management unit 58b creates the split-path connection management data and stores this data in the storage unit 57b. Next, if the connection request message a-3 for the downstream bandwidth is received, similar processing is executed and, hence, the following items are stored in the storage unit 57b: (1) a call number, (2) an upstream connection ID (VPI/VCI), (3) a downstream connection ID (VPI/VCI), (4) an upstream path number and (5) a downstream path number, etc. (step 254).

In parallel with the above operation, the call controller 51b reports the connection request message a-2 to the connection request receiving management unit 72b. If the connection request message a-2 is received, the connection request receiving management unit 72b stores the call number of this message and the upstream receive identification data in the storage unit 71b. Next, if the connection request message a-3 for the downstream bandwidth is received, similar processing is executed and the call number and upstream/downstream receive identification data is stored in the storage unit 71b. If the connection request messages a-2, a-3 split between the upstream/downstream directions are received, the connection request receiving management unit 72b combines these connection request messages a-2, a-3 to thereby recompile the original bidirectional connection request message a-1 (step 255). The connection request call a-1 is reported to the destination terminal 22 (step 256). It should be noted that the connection request call a-1 reported to the terminal 22 includes a call number, an upstream reported bandwidth, a downstream reported bandwidth and a call identification ID (VPI/VCI) of the upstream/downstream data cell.

By virtue of the above operation, terminal equipment can be constructed without requiring an awareness of whether a call is a split-path call. Further, it is possible to effect a connection over separate upstream and downstream paths without changing the connection information at the terminals 21, 22.

(c) Control for Sending/Receiving Call Message

Figure 8:
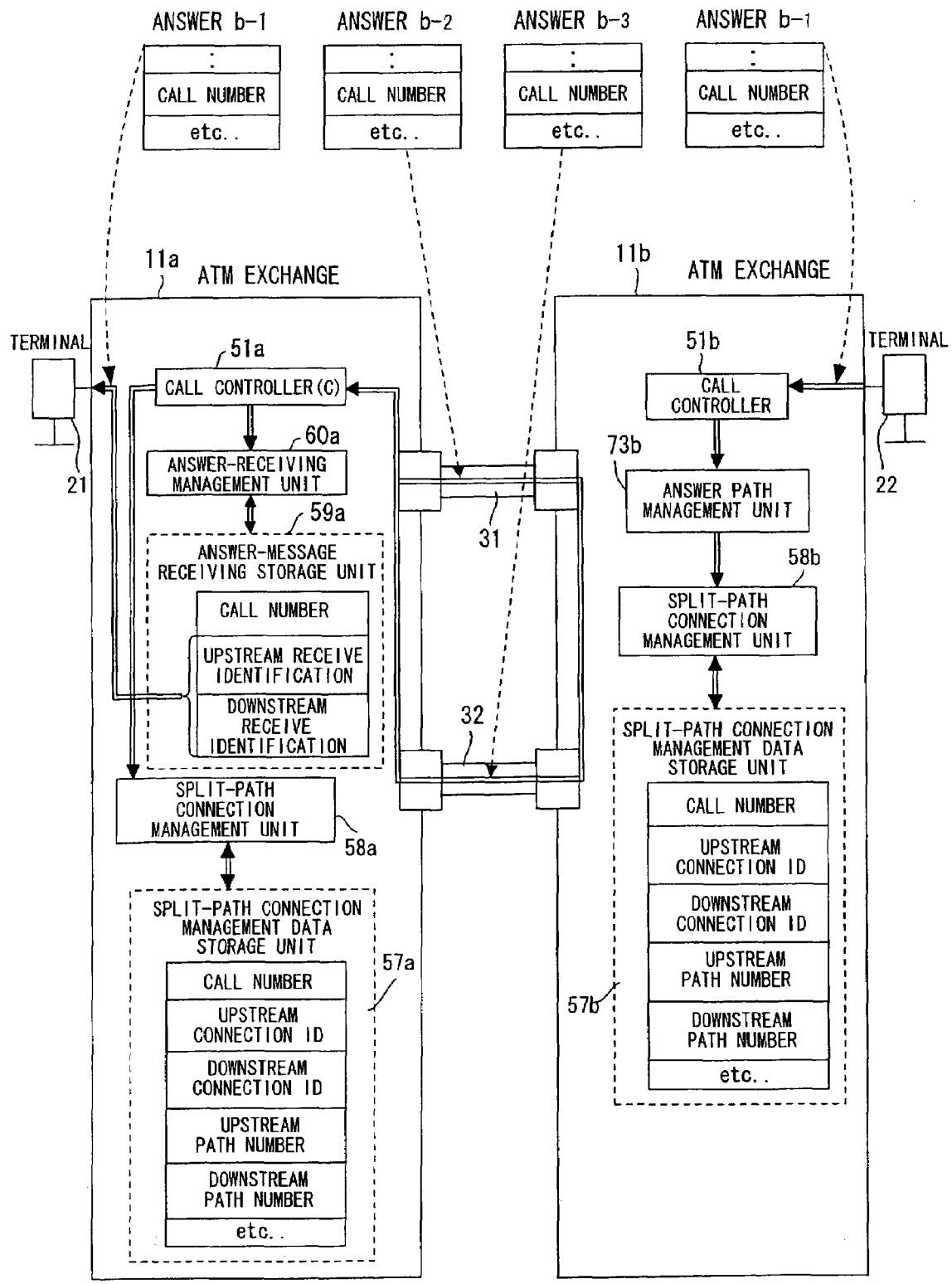
FIG. 8 is a diagram useful in describing control for sending and receiving an answer message of a split-path call.
Figure 9:
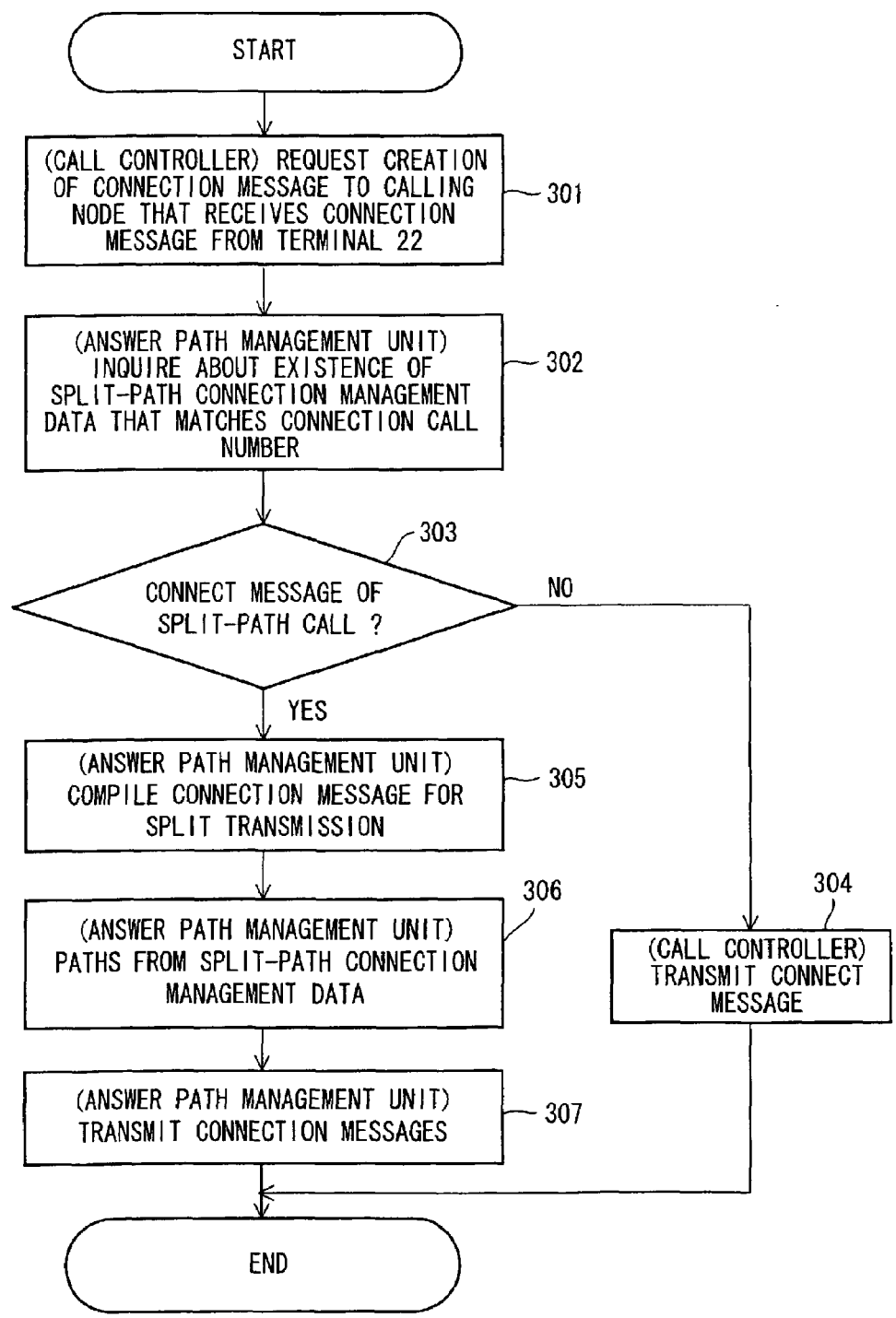
FIG. 9 is a flowchart of processing for transmitting an answer message at a called node.
Figure 10:
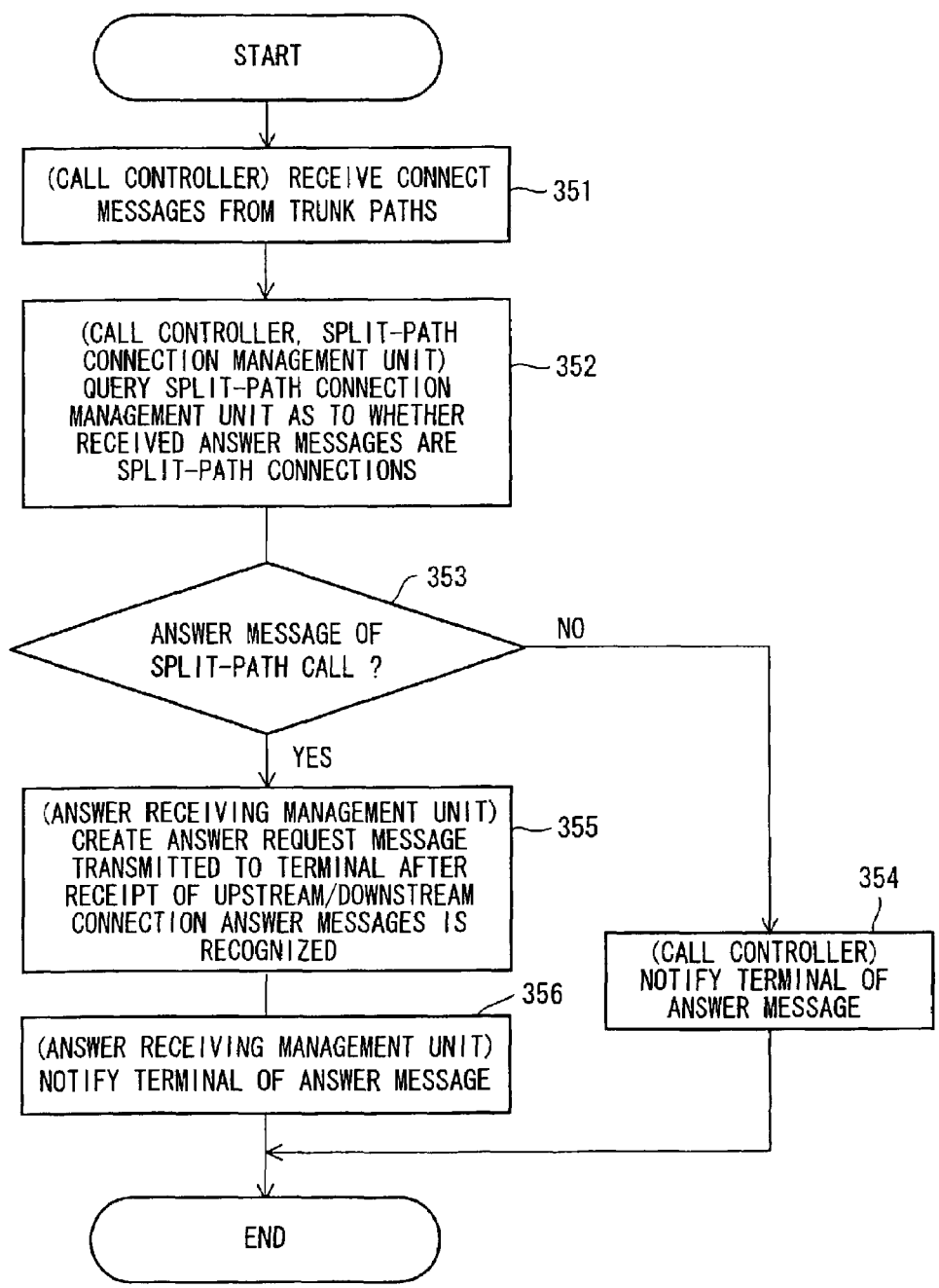
FIG. 10 is a flowchart of processing for receiving an answer message at a calling node.

FIG. 8 is a diagram useful in describing control for sending and receiving an answer message of a split-path call, FIG. 9 is a flowchart of processing for transmitting an answer message at a called node, and FIG. 10 is a flowchart of processing for receiving an answer message at an calling node. Components in FIG. 8 identical with those shown in FIG. 2 are designated by like reference characters.

If the connection request call a-1 is received, the terminal 22 transmits an answer message (connect message) b-1 to the call controller 51b. The answer message b-1 includes a call number identical with that of the connection request message a-1. If the answer message is received (step 301), the call controller 51b delivers the answer message b-1 to the answer path management unit 73b and requests creation and transmission of an answer message to the calling node.

Upon receiving the answer transmission request, the answer path management unit 73b queries the split-path connection management unit 58b as to whether split-connection information having the call number contained in the answer message b-1 has been stored in the storage unit 57b (step 302). That is, the split-path connection management unit 58b is queried as to whether the answer message b-1 is an answer message of a split-path call. If the answer message is not an answer message of a split-path call (step 303), an answer message directed to the calling node is immediately created and transmitted (step 304).

If the answer message is an answer message of a split-path call, on the other hand (step 303), then the answer path management unit 73b creates upstream and downstream answer messages b-2 and b-3, respectively (step 305), decides the answer transmit paths 31, 32 based upon the split-path connection management data (step 306) and transmits the upstream and downstream answer messages b-2 and b-3, respectively, to the called node 11a via the answer transmit paths 31, 32, respectively (step 307).

If the answer messages b-2 and b-3 are received (step 351), the call controller 51a of the called node 11a queries the split-path connection management unit 58a as to whether the answer messages b-2 and b-3 are answer messages in response to a split-path call. On the basis of the call numbers of the answer messages b-2 and b-3 and the split-call connection management data, the split-path connection management unit 58a determines whether these messages are answer messages of a split-path call and reports the result to the controller 51a (step 352).

If a message is not an answer message of a split-path call (step 353), the call controller 51a reports the answer message to the calling terminal 21 (step 354).

If a message is an answer message of a split-path call, on the other hand, the call controller 51a reports receipt of the answer message of the split-path call to the answer-receiving management unit 60a. Upon receiving the report, the answer-receiving management unit 60a determines whether the message is an answer message from the upstream path or an answer message from the downstream path (it is assumed here that the message is the answer message b-2 from the upstream path) and stores the call number and the upstream receive identification data of the answer message b-2 in the storage unit 59a.

Next, if the response message b-3 from the downstream path is received, similar processing is executed and the call number, upstream receive identification data and downstream receive identification data are stored in the storage unit 59a. If the answer messages b-2, b-3 split between the upstream/downstream directions are received, the answer-receiving management unit 60a recompiles the original bidirectional answer message b-1 (step 355) and reports this answer message b-1 to the calling terminal 21 (step 356). The answer message b-1 reported to the terminal 21 contains a call number and a connection identifier (VPI/VCI) that the terminal is to attach to the data cell.

By virtue of the above operation, it is possible to effect a connection over separate upstream and downstream paths without changing the connection information at the terminals 21, 22.

(d) Sending and Receiving of Release Message

Figure 11:
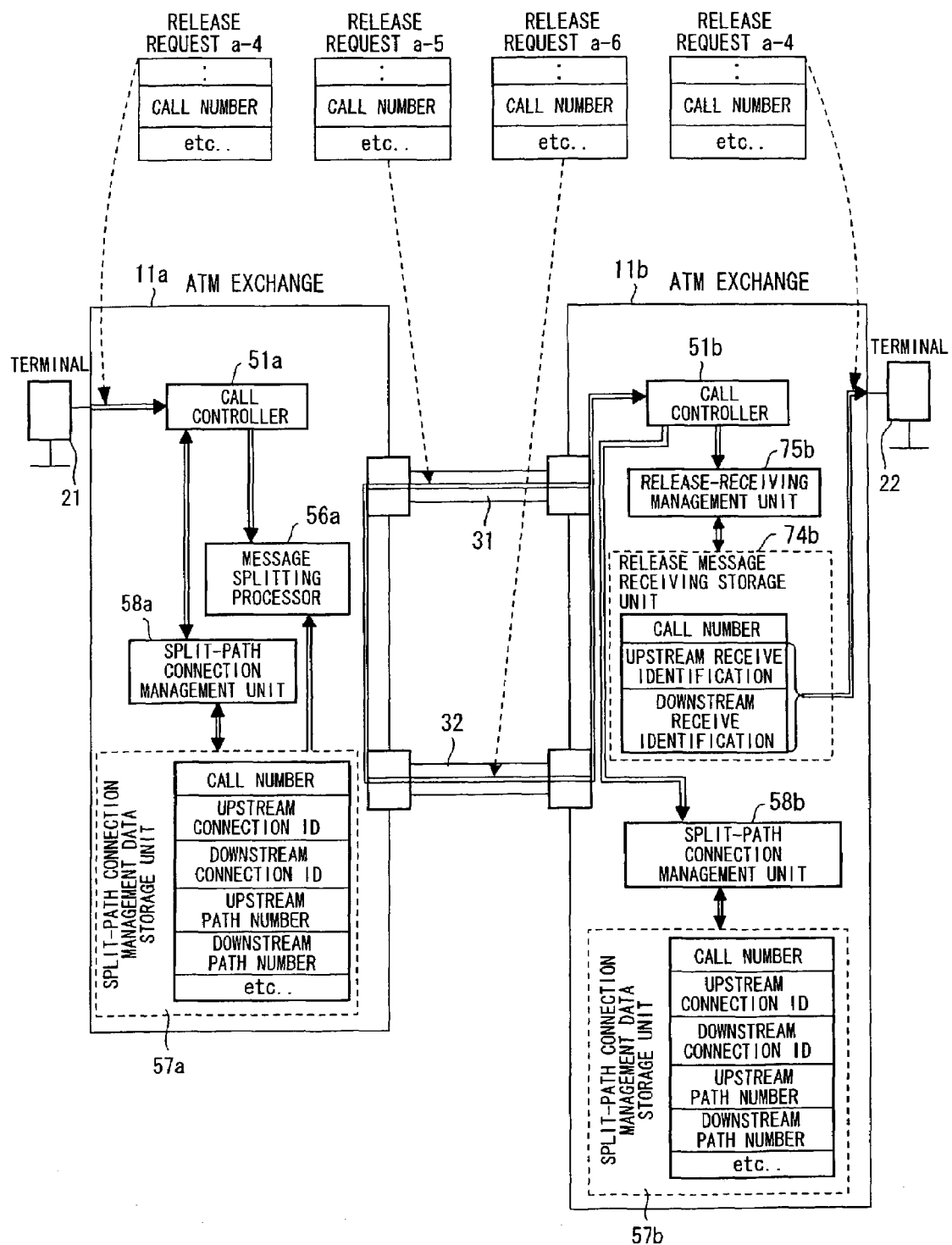
FIG. 11 is a diagram useful in describing control for sending and receiving a release message of a split-path call.
Figure 12:
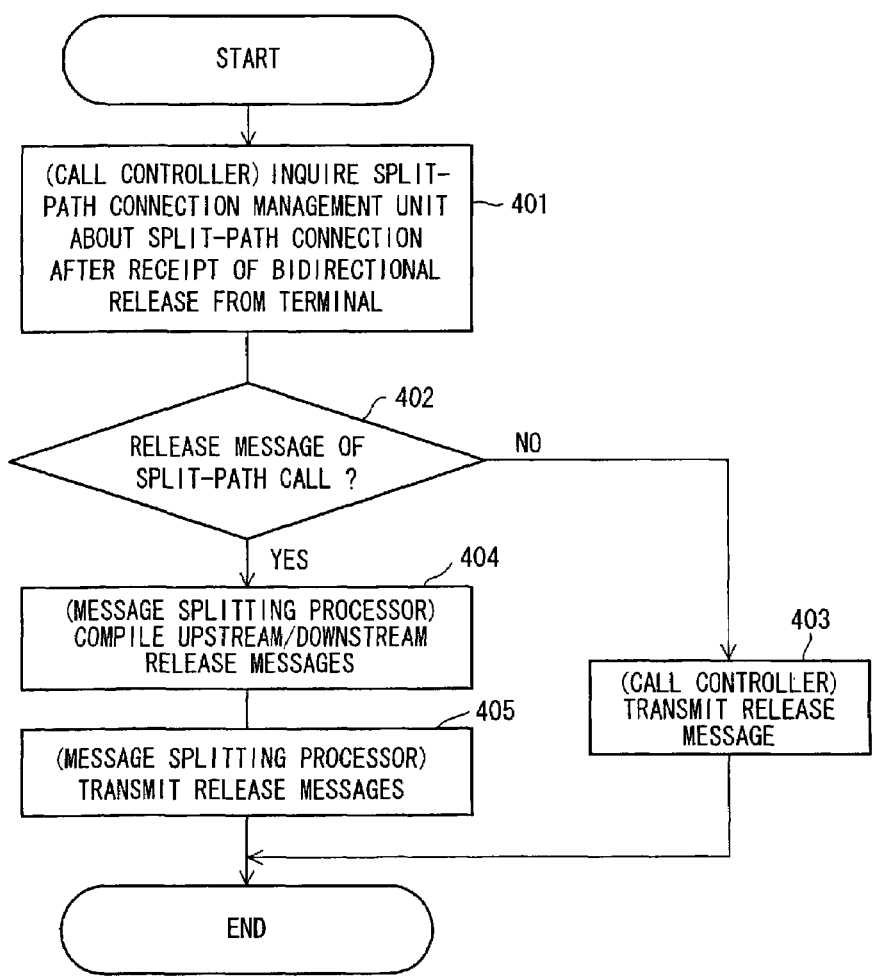
FIG. 12 is a flowchart of processing for transmitting a release message.
Figure 13:
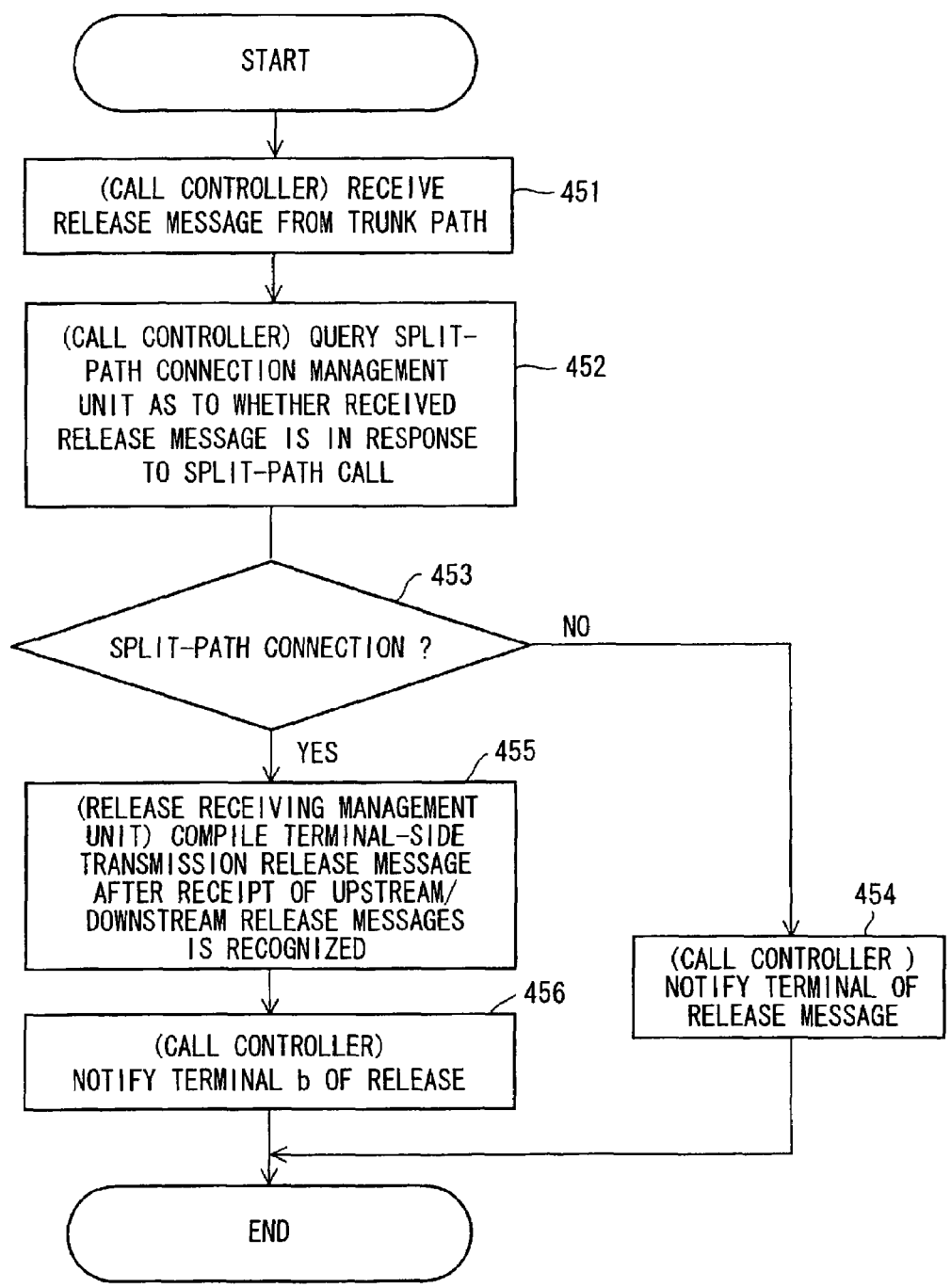
FIG. 13 is a flowchart of processing for receiving a release message.

FIG. 11 is a diagram useful in describing control for sending and receiving a release message of a split-path call, FIG. 12 is a flowchart of processing for transmitting a release message and FIG. 13 is a flowchart of processing for receiving a release message. Components in FIG. 11 identical with those shown in FIG. 2 are designated by like reference characters.

If a release message a-4 that includes a call number is received from the calling terminal 21, the call controller 51a of the calling node 11a presents the call number to the split-path connection management unit 58a and queries the latter as to whether the message is a release message corresponding to a split-path call. Upon being queried, the split-path connection management unit 58a, on the basis of the call number, refers to the split-path connection management data that has been stored in the storage unit 57a, determines whether the release message a-4 is a release message corresponding to a split-path call and replies to the call controller 51a with the result.

If the release message a-4 is not a release message corresponding to a split-path call (step 402), the call controller 51a transmits the release message to the called node 11b (step 403). If the release message a-4 is a release message corresponding to a split-path call, on the other hand (step 402), then the call controller 51a instructs the message splitting processor 56a to transmit release messages via the upstream and downstream paths. In this case, the call controller 51a delivers the release message a-4 to the message splitting processor 56a. Upon receiving the transmission request, the message splitting processor 56a refers to the release message a-4 and creates release messages a-5, a-6 for upstream/downstream bandwidths (step 404).

Next, from the split-path connection management data, the message splitting processor 56a obtains the upstream/downstream paths 31, 32 that have been allocated to the split-path call and transmits the release messages a-5, a-6 to the called node 11b via the upstream/downstream paths 31, 32 (step 405).

If a release message (assumed here to be the release message a-5) is received (step 451), the call controller 51b of the called node 11b presents the call number of the release message a-5 to the split-path connection management unit 58b and queries the latter as to whether the message is a release message corresponding to a split-path call. Upon being queried, the split-path connection management unit 58b, on the basis of the call number, refers to the split-path connection management data that has been stored in the storage unit 57b, determines whether the release message a-5 is a release message corresponding to a split-path call and replies to the call controller 51b with the result (step 452).

If the received release message a-5 is not a release message corresponding to a split-path call (step 453), the call controller 51b transmits the release message to the destination terminal 22 (step 454)

On the other hand, if the received release message a-5 is a release message corresponding to a split-path call (step 453), then the release message a-5 is reported to the release receiving management unit 75b. If the release message a-5 is received, the release receiving management unit 75b stores the call number and the upstream receive identification data of this message in the storage unit 74b.

If the release request message a-6 for the downstream bandwidth is received, similar processing is executed and, finally, the call number of upstream/downstream receive identification data are stored in the storage unit 74b.

If the release messages a-5, a-6 split between the upstream/downstream directions are received, the release receiving management unit 75b combines these release messages a-5, a-6 to recompile the original bidirectional release message a-4 (step 455) and reports the release message a-4 to the destination terminal 22 (step 456).

By virtue of the above operation, it is possible to release a connection over separate upstream and downstream paths without changing the connection information at the terminals 21, 22.

(e) Reconnection Owing to Path Failure

Figure 14:
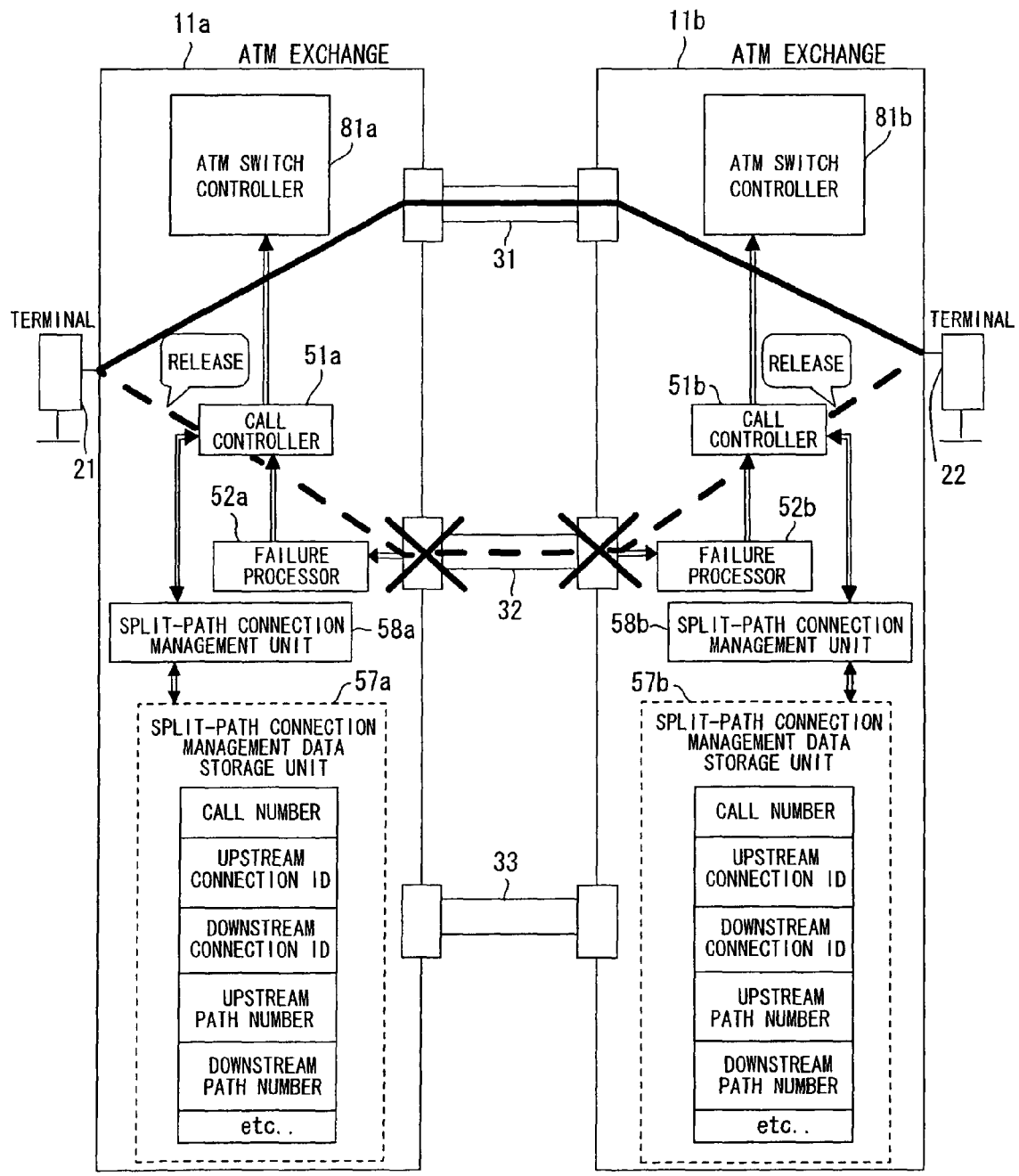
FIG. 14 is a first explanatory view of reconnect control when an upstream or downstream path fails.
Figure 15:
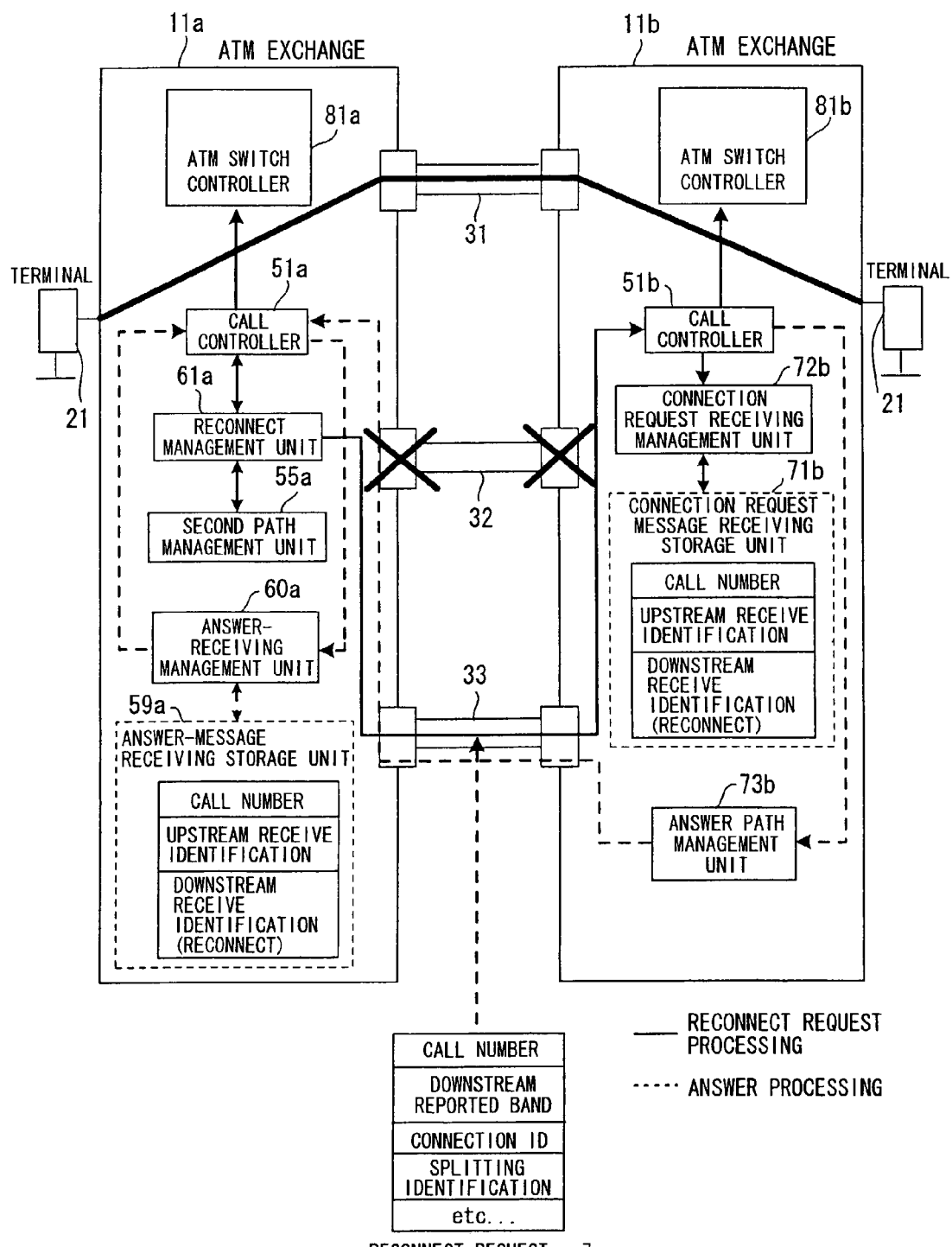
FIG. 15 is a second explanatory view of reconnect control when an upstream or downstream path fails.
Figure 16:
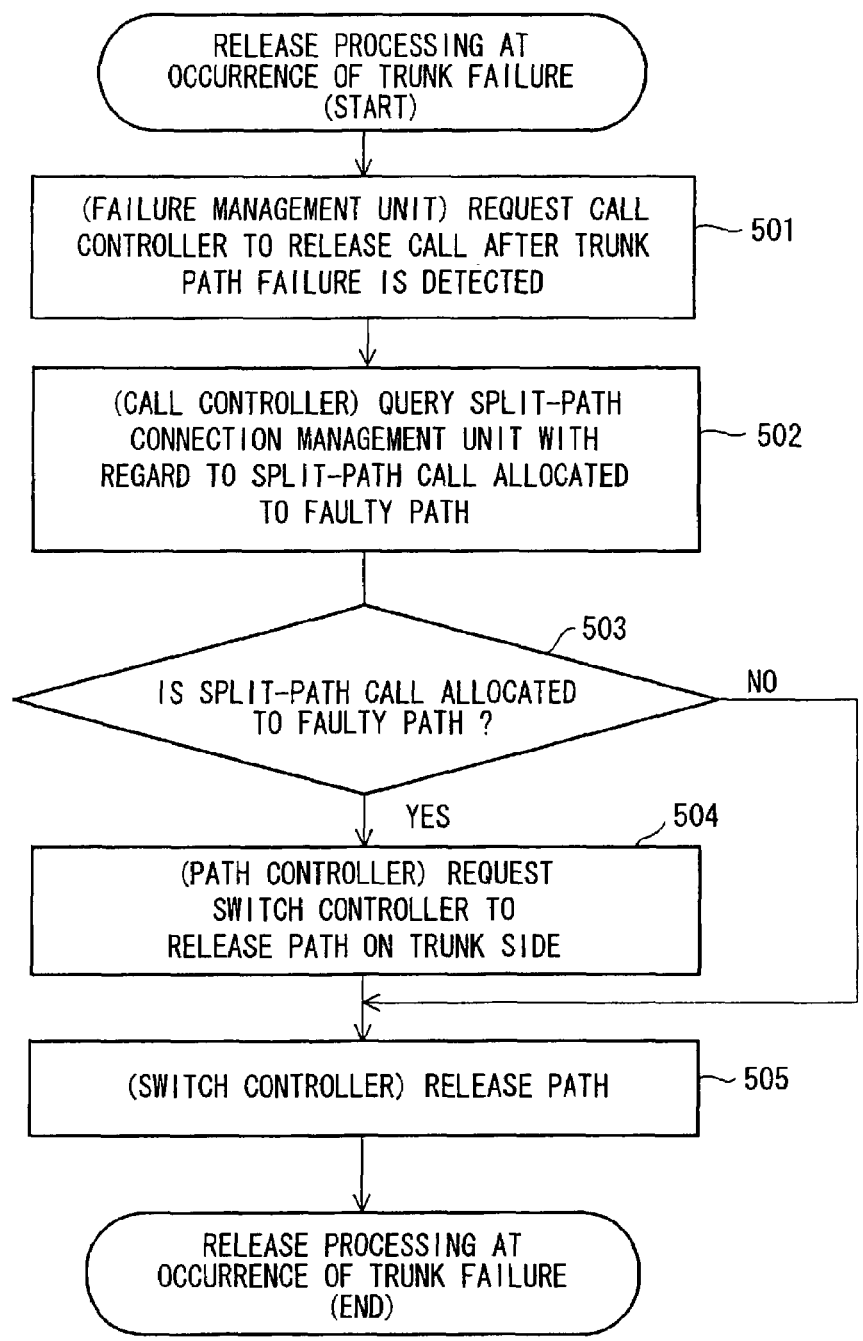
FIG. 16 is a flowchart of processing for path release when a failure occurs.
Figure 17:
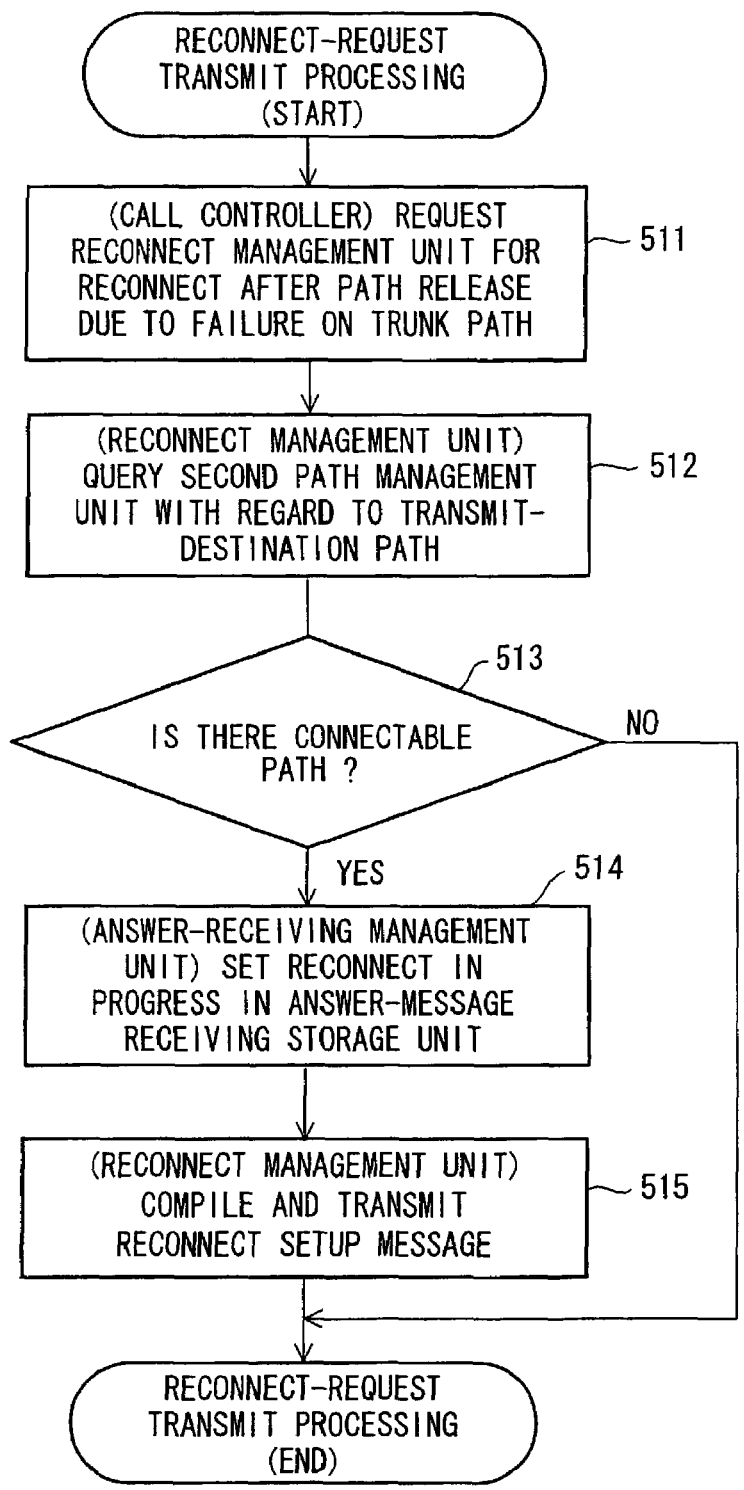
FIG. 17 is a flowchart of processing for transmitting a reconnect request when a failure occurs.
Figure 18:
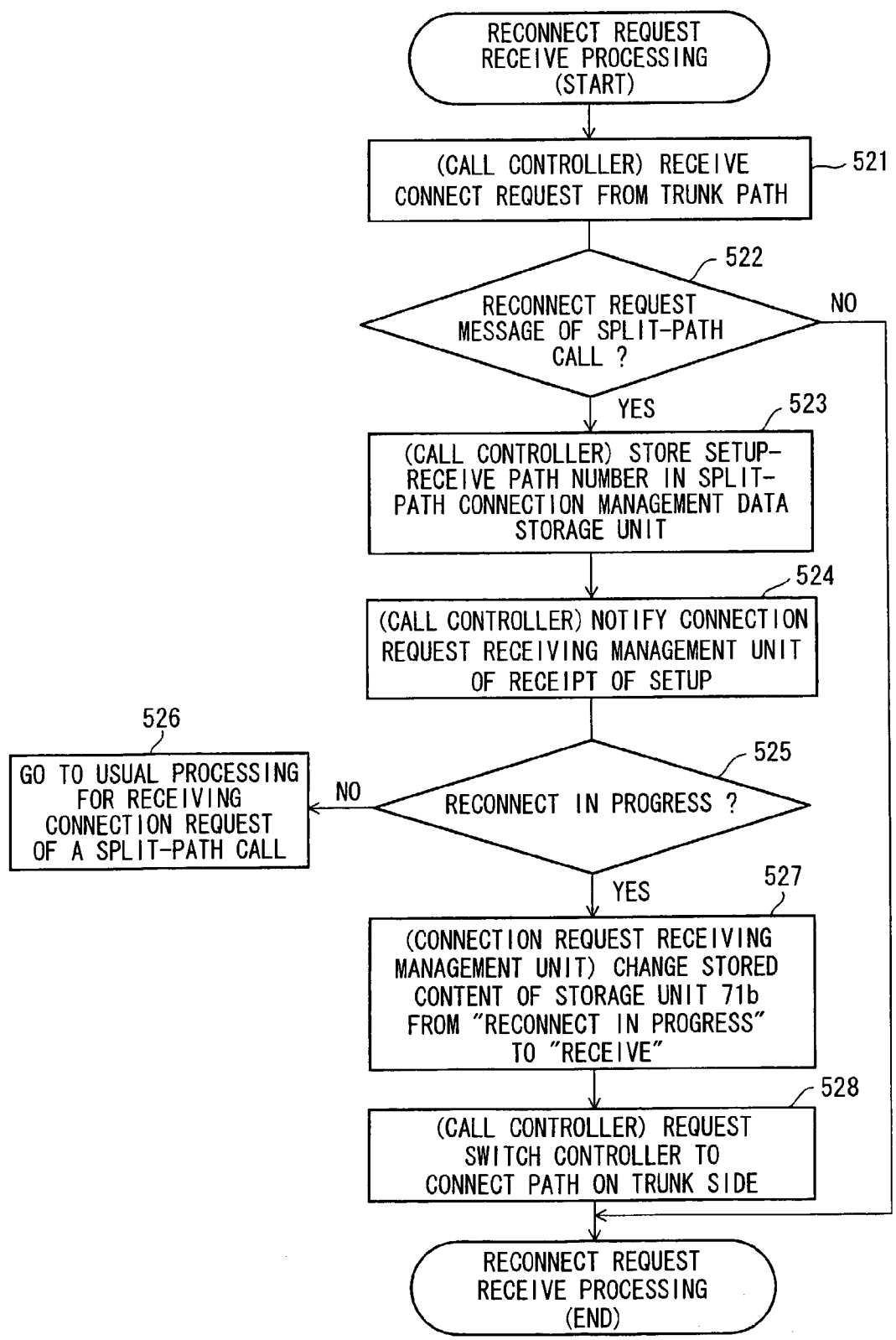
FIG. 18 is a flowchart of processing for receiving a reconnect request when a failure occurs.
Figure 19:
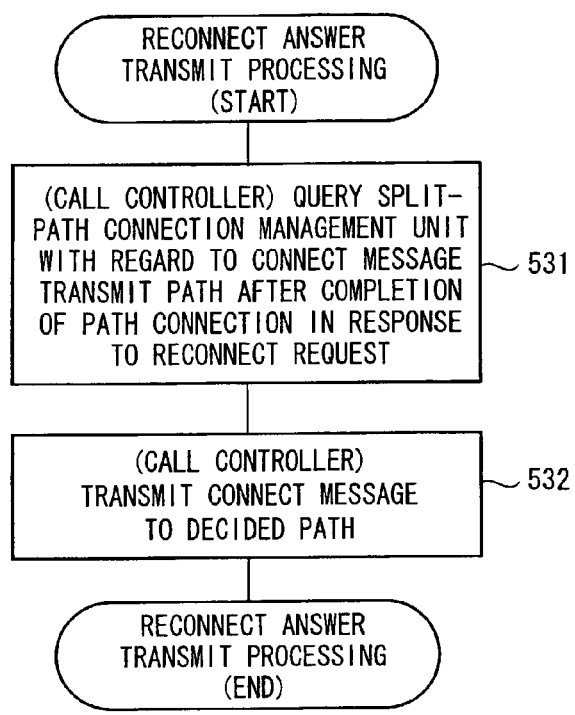
FIG. 19 is a flowchart of processing for transmitting an answer in response to a reconnect request.
Figure 20:
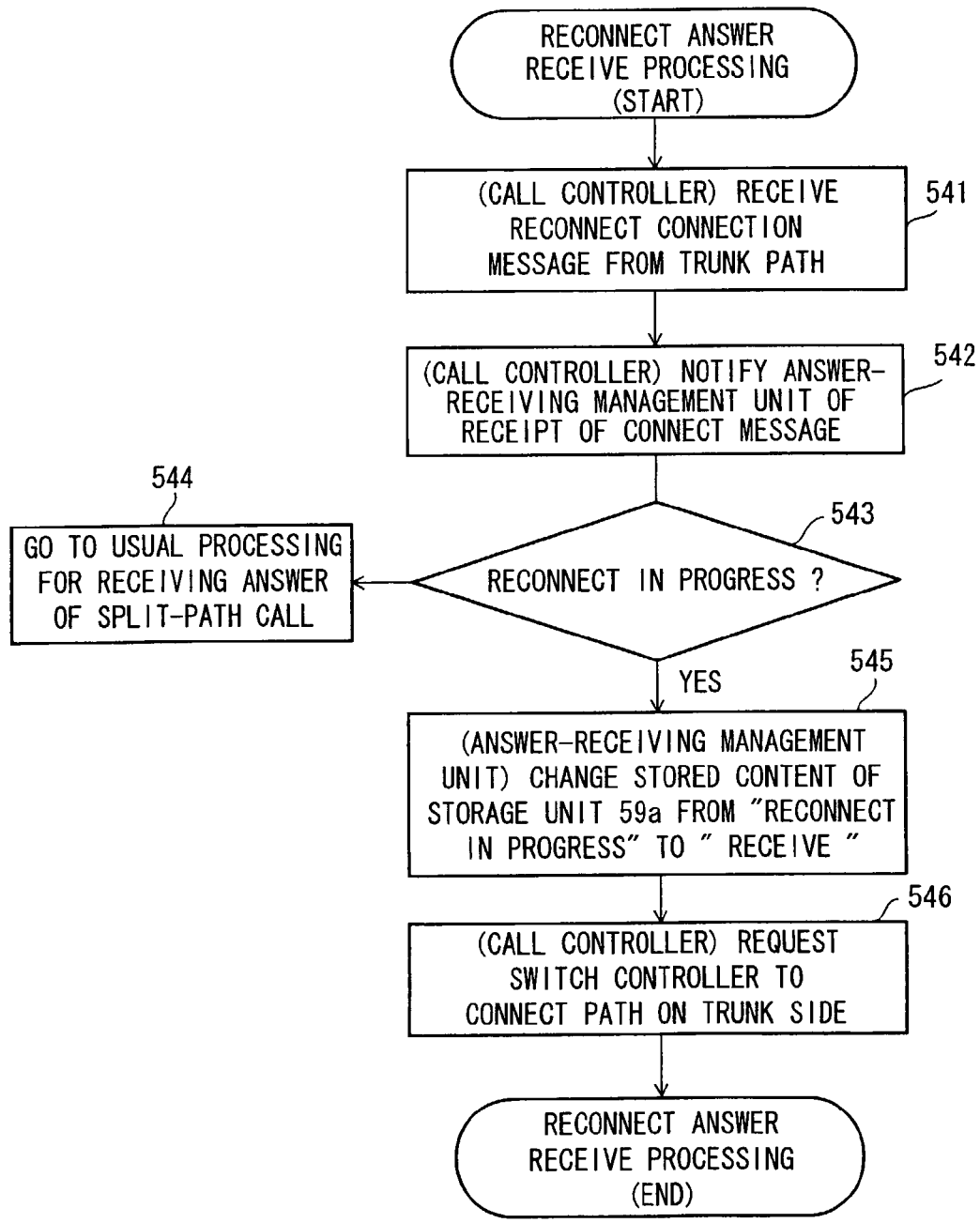
FIG. 20 is a flowchart of processing for receiving an answer in response to a reconnect request.

FIGS. 14, 15 are explanatory views of reconnect control when a failure occurs in one of the upstream/downstream paths. Components identical with those shown in FIG. 2 are designated by like reference characters. FIG. 16 is a flowchart of processing for path release when a failure occurs, FIG. 17 is a flowchart of processing for transmitting a reconnect request when a failure occurs, FIG. 18 is a flowchart of processing for receiving a reconnect request when a failure occurs, FIG. 19 is a flowchart of processing for transmitting an answer in response to a reconnect request, and FIG. 20 is a flowchart of processing for receiving an answer in response to a reconnect request.

If a failure occurs on either upstream path 31 or downstream path 32 (assumed here to be path 32) during communication separately via the upstream/downstream paths, the failure management units 52a, 52b detect the failure and request the call controllers 51a, 51b, respectively, to release the call (step 501). If notification of occurrence of the failure is received, the call controllers 51a, 51b query the split-path connection management units 58a, 58b with regard to a split-path call that may have been allocated to the faulty path 32 (step 502).

If a split-path call allocated to the faulty path 32 exists (step 503), the call controllers 51a, 51b instruct their own ATM switch controllers 81a, 81b to release the path between the faulty path 32 and the terminal 21 and the path between the faulty path 32 and the terminal 22 (step 504). In response to these requests, the ATM switch controllers 81a, 81b of the calling/called nodes 11a, 11b delete the connection ID (VPI/VCI) attached to the downstream cell of the split-path call from the routing tables RTL and release the downstream path 32 (step 505). Further, the call controller 51b controls the connection request receiving management unit 72b (FIG. 15) to set, in the storage unit 71b, the fact that downstream-path reconnect is in progress.

The call controller 51a of the calling node subsequently requests the reconnect management unit 61a to execute reconnect processing (step 511). Upon receiving the reconnect request, the reconnect management unit 61a requests the second path management unit 55a to search for another path having available bandwidth equal to or greater than the reported bandwidth that has been allocated to the released downstream path 32 (step 512).

When another path 33 is found (step 513), the reconnect management unit 61a sets the fact that faulty-path (downstream-path) reconnect is in progress in the storage unit 59a via the answer-receiving management unit 60a (step 514). Next, the reconnect management unit 61a creates a connection request message a-7 for reconnect and transmits this message to the called node 11b via this other path 33 (step 515). The connection request message a-7 contains a call number, downstream reported bandwidth, downstream connection ID (VPI/VCI) and split identifying data.

When the call controller 51b at the called node receives the connection request message a-7 for reconnect, the call controller 51b determines, based upon the split identifying data, whether the message is a reconnect request message of a split-path call (step 522). If the message is a reconnect request message of a split-path call, the call controller 51b notifies the split-path connection management unit 58b (FIG. 14) of the call number and number of the connection request message receive path and updates the stored content of the storage unit 57b (step 523).

Further, the call controller 51b reports receipt of the connection request message of the split-path call to the connection request receiving management unit 72b (step 524). Upon receiving the report, the connection request receiving management unit 72b refers to the call number and to the stored data in the storage unit 71b and determines whether reconnect due to failure is in progress (step 525). If reconnect is not in progress, the connection request receiving management unit 72b executes the usual processing for receiving the connection request of a split-path call (step 526). If reconnect is in progress, however, the connection request receiving management unit 72b changes the stored content of the storage unit 71 from "downstream reconnect in progress" to "downstream receive" (step 527).

Next, the call controller 51b controls the ATM switch controller 81b to set up the path between the path 33 and the destination terminal 22 (step 528).

After completion of path connection in response to the reconnect request, the call controller 51b queries the split-path connection management unit 58b with regard to the answer-message transmit path (step 531), delivers the number of the answer-message transmit path 33 to the answer path management unit 73b and instructs the answer path management unit 73b to transmit an answer message to the calling node. In response, the answer path management unit 73b creates an answer message and transmits this answer message to the calling node via the instructed path 33 (step 532).

If the answer message is received (step 541), the call controller 51a reports receipt of the answer message to the answer-receiving management unit 60a (step 542). Upon receiving the report, the answer-receiving management unit 60a refers to the call number of the answer message and to the stored contents of the answer-message receiving storage unit 59a and checks to see whether reconnect due to failure is in progress (step 543).

If reconnect due to failure is not in progress, the answer-receiving management unit 60a executes the usual processing for receiving the answer of a split-path call (step 544). If failure is in progress, however, the answer-receiving management unit 60a changes the stored content of the storage unit 59a from "downstream reconnect in progress" to "downstream receive" (step 545). The call controller 51a then controls the ATM switch controller 81a to set up the path between the calling terminal 21 and the path 33 (step 546).

By virtue of the above operation, it is possible to reconnect a downstream connection, which has been released owing to failure, while communication over the normal upstream path 31 is continued.

(D) Details of Various Messages

FIG. 21 is a diagram useful in describing a setup message, which is the connection request message. The main information elements are as follows:

(1) call number or call identifier (call reference);

(2) message type (data indicating that the message is a setup message);

(3) ATM trunk descriptor, which describes upstream reported bandwidth and downstream reported bandwidth;

(4) called party number;

(5) calling party number; and (6) connection identifier.

It should be noted that the connection identifier is not included in the terminal→office setup message.

Figure 22:
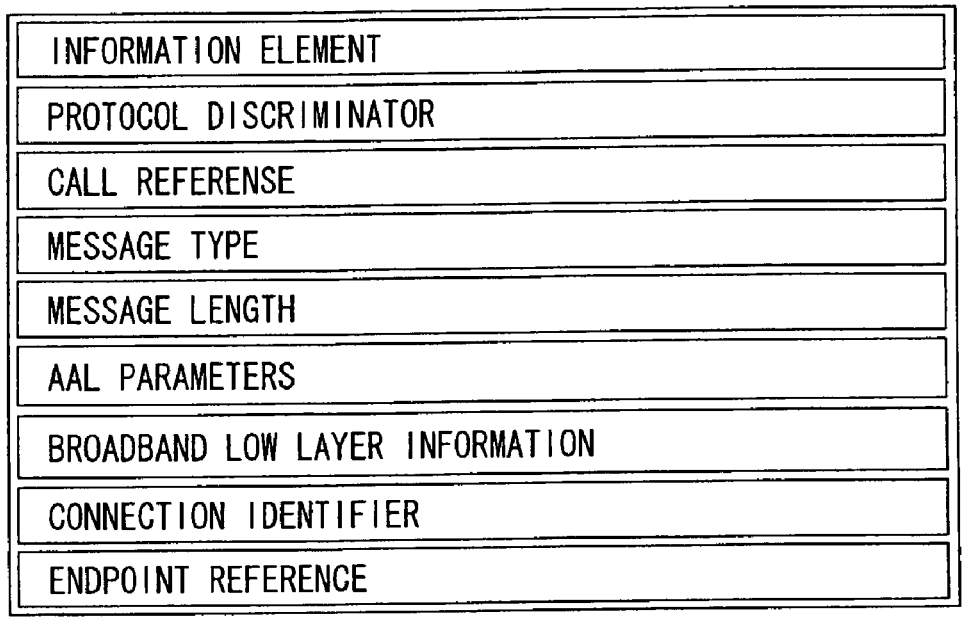
FIG. 22 is a diagram useful in describing a connect message.

FIG. 22 is a diagram useful in describing a connect message, which includes (1) a call number (call reference), (2) message type (data indicating that the message is a connect message), and (3) a connection identifier.

Figure 23:
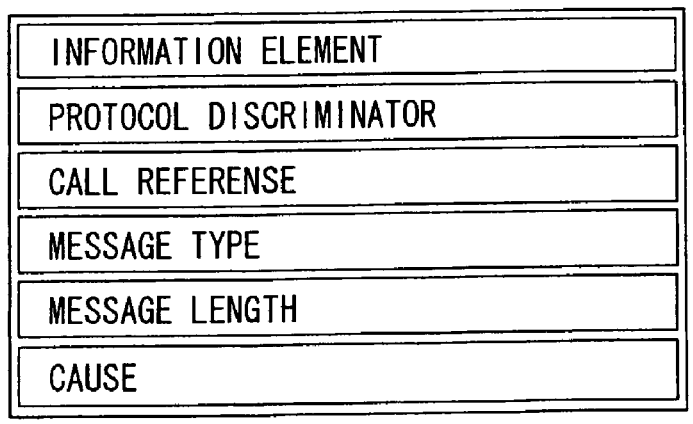
FIG. 23 is a diagram useful in describing a release message.

FIG. 23 is a diagram useful in describing a release message, which includes (1) a call number (call reference) and (2) message type (data indicating that the message is a release message).

Figure 24:
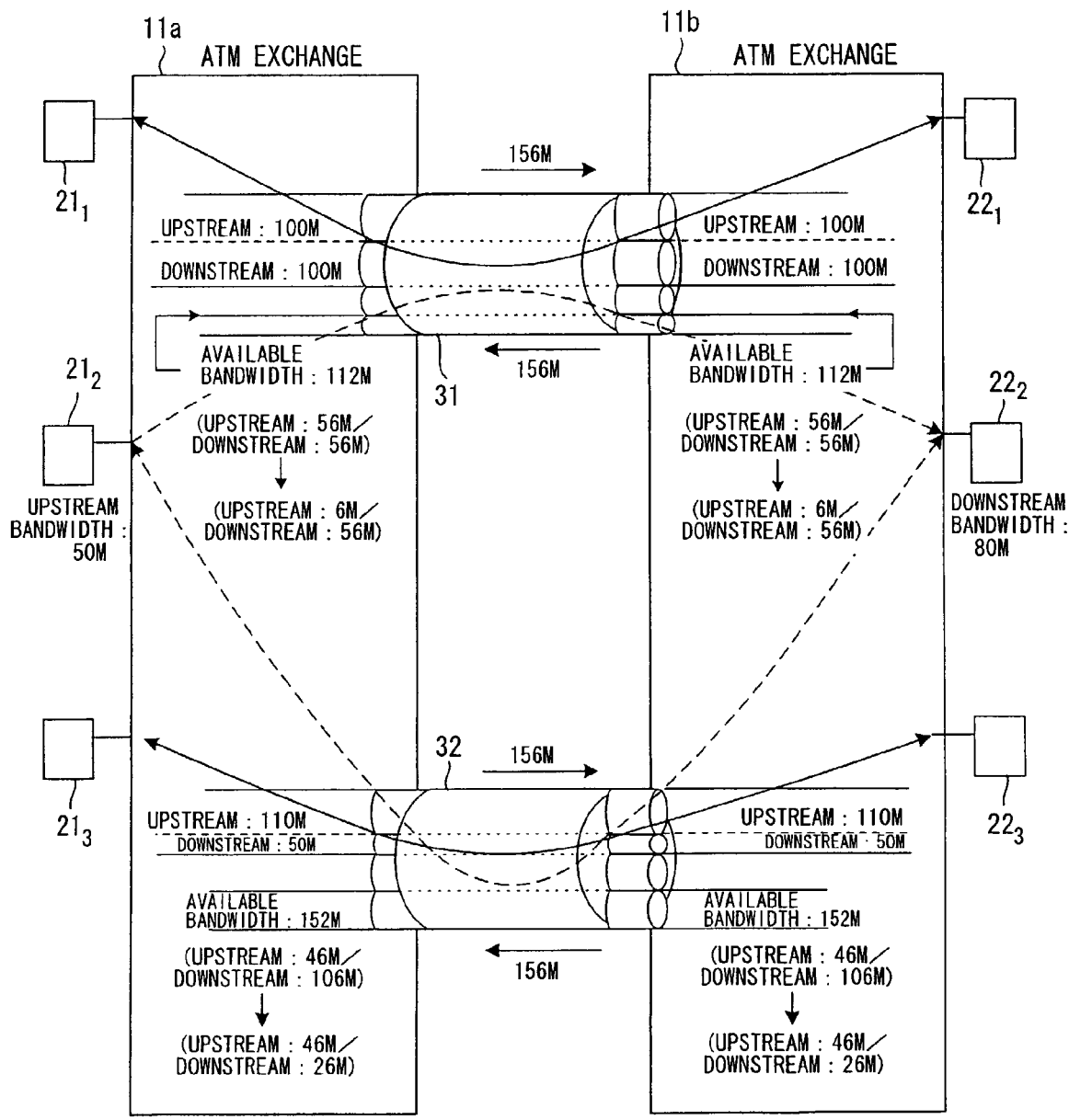
FIG. 24 is an explanatory view for describing upstream/downstream used bandwidths and available bandwidths on each line and upstream/downstream reported bandwidths of a connection request call.

(E) Embodiment of Call Processing Control According to the Invention (a) Call Admission Control FIG. 24 is an explanatory view for describing upstream/downstream used bandwidths and available bandwidths on each trunk line and upstream/downstream reported bandwidths of a connection request call.

The trunk circuits 31, 32 both have maximum bandwidths of 156M in the upstream/downstream directions. Here 100M/100M are used in communication between terminals $21_1$, $22_1$ as the upstream/downstream bandwidths of a trunk circuit 31, and the upstream/downstream available bandwidths are 56M/56M. Further, 110M/50M are used in communication between terminals $21_3$, $22_3$ as the upstream/downstream bandwidths of a trunk circuit 32, and the upstream/downstream available bandwidths are 46M/106M. Call admission control according to the present invention will be described for a case where a call connection request is issued from the calling terminal $21_2$ to the destination terminal $22_2$ (where the upstream/downstream reported bandwidths are 50M/80M, respectively).

Figure 25:
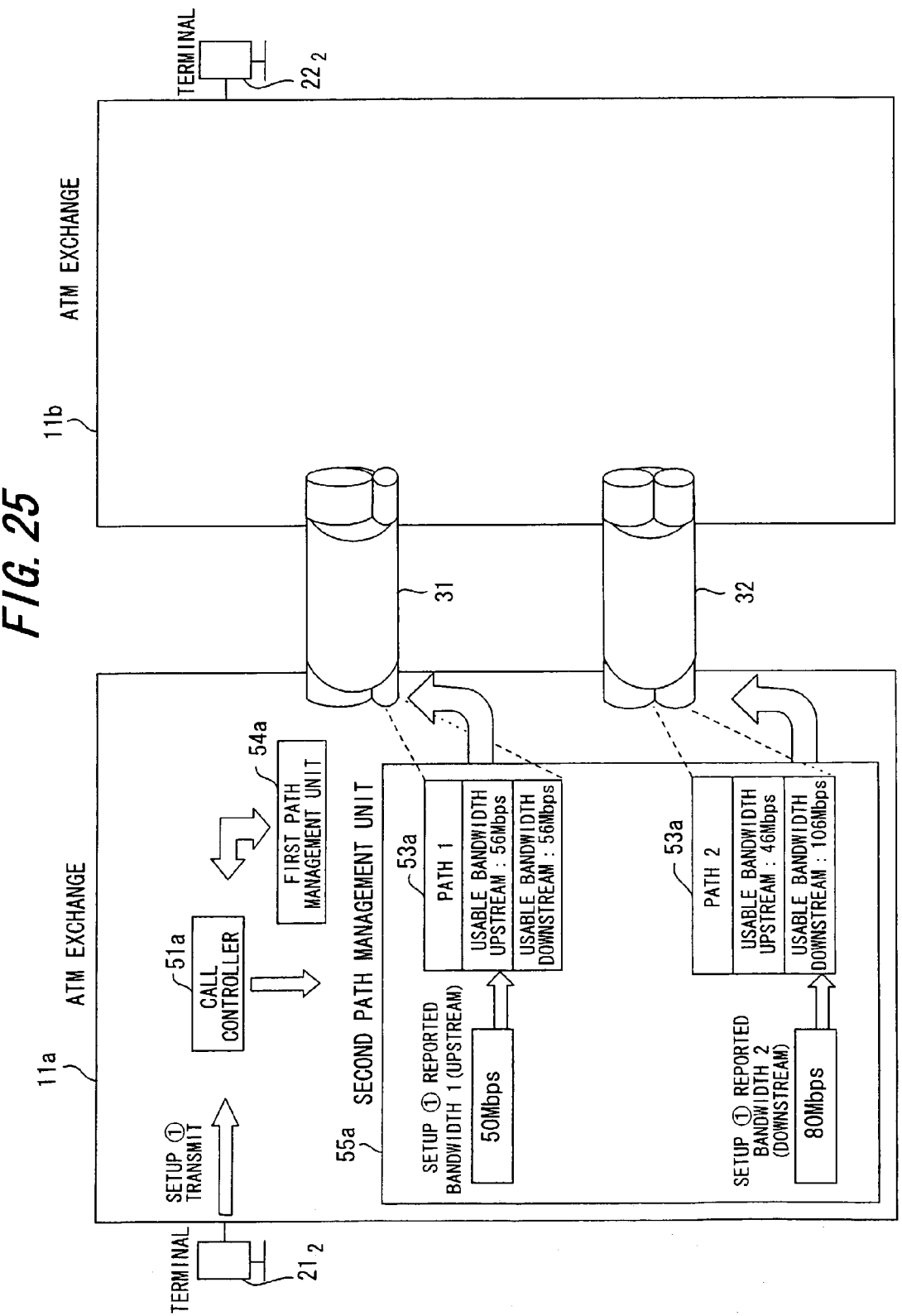
FIG. 25 is a diagram useful in describing call admission control according to the present invention.

FIG. 25 is a diagram useful in describing call acceptance control of the present invention.

When the call controller 51a receives a connection request (setup message) transmitted from the terminal $21_2$, the call controller 51a instructs the first path management unit 54a to search for a connectable path. In response, the first path management unit 54a refers to the stored information in the path-status storage unit 53a, searches for a path that satisfies the upstream/downstream reported bandwidths of 50M/80M specified by setup message ① and reports the search result to the call controller 51a. In the example of FIG. 24, the call controller 51a is notified of the fact that a path satisfying the upstream/downstream reported bandwidths of 50M/80M could not be found.

If a path satisfying the upstream/downstream reported bandwidths does not exist, the call controller 51a queries the second path management unit 55a with regard to paths that satisfy only the upstream reported bandwidth of 50M and only the downstream reported bandwidth of 80M. Upon receiving the inquiry, the second path management unit 55a notifies the call controller 51b of the fact that the upstream usable bandwidth (56 Mbps) of path 31 is larger than the upstream reported bandwidth (50M) of the setup message and that the downstream usable bandwidth (106M) of path 32 is larger than the downstream reported bandwidth (80 Mbps) of the setup message. In response, the call controller 51a accepts the connection request call as a split-path call and allocates the upstream reported bandwidth and downstream reported bandwidth to respective ones of the paths. As a result, the upstream/downstream usable bandwidth of path 31 becomes 6M/56M and the upstream/downstream usable bandwidth of path 32 becomes 46M/23M.

(b) Control for Sending and Receiving Call-Connection Request Messages

Figure 26:
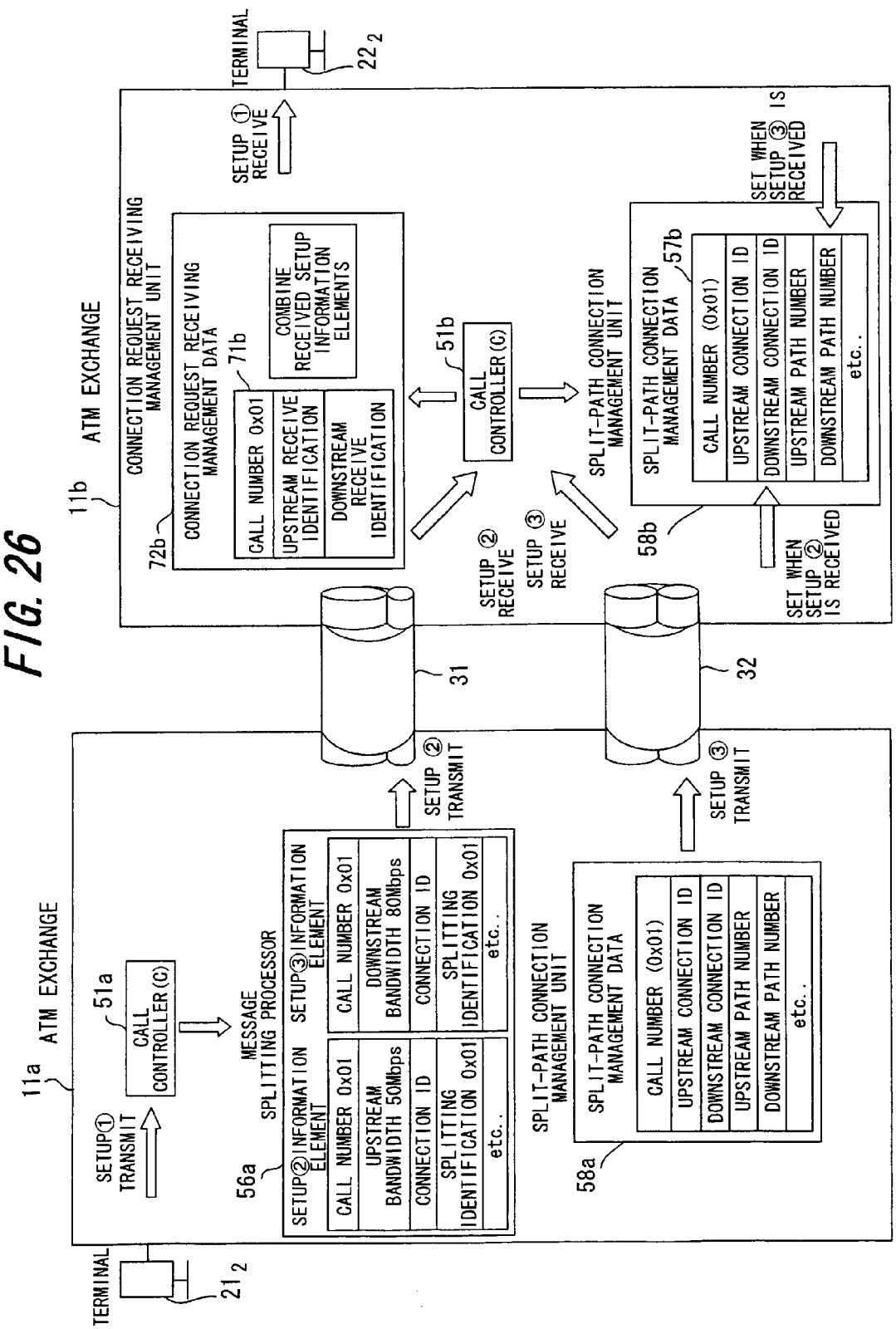
FIG. 26 is a diagram useful in describing control for sending and receiving a call-connection request message.

FIG. 26 is a diagram useful in describing control for sending and receiving call-connection request messages.

The call controller 51a, which has decided the transmit path of setup message ①, requests the message splitting processor 56a to transmit the setup message ①. Upon receiving the transmit request, the message splitting processor 56a generates setup messages ②, ③ for upstream and downstream bandwidths each having a call number (0x01 in the example) identical with that of the setup message received from the terminal $21_1$. At this time the message splitting processor 56a sets the information element (splitting identification 0x01), which indicates whether the message is a setup message of a split-path call, in the setup message ② for the upstream bandwidth and in the setup message ③ for the downstream bandwidth and transmits the messages.

The call controller 51b of the called node 11b, which has received the setup messages ②, ③ from the lines 31, 32, determines, from the information elements (splitting identifications) of these messages, that the messages are setup messages of a call (split-path call) transmitted upon splitting the path, sets the call number, the upstream/downstream connection ID and the upstream/downstream path numbers, etc., in the split-path connection management data storage unit 57b, and then reports receipt of the split-path connection to the connection request receiving management unit 72b.

Upon receiving this report, the connection request receiving management unit 72b manages receipt of upstream/downstream setup messages in accordance with the call number and, when receipt of both setup messages ②, ③ is recognized, combines the received setup message ② for the upstream bandwidth and received setup message ③ for the downstream bandwidth, thereby generating bidirectional setup message ①, and reports this to the terminal $22_2$.

(c) Control for Sending and Receiving Answer Messages

Figure 27:
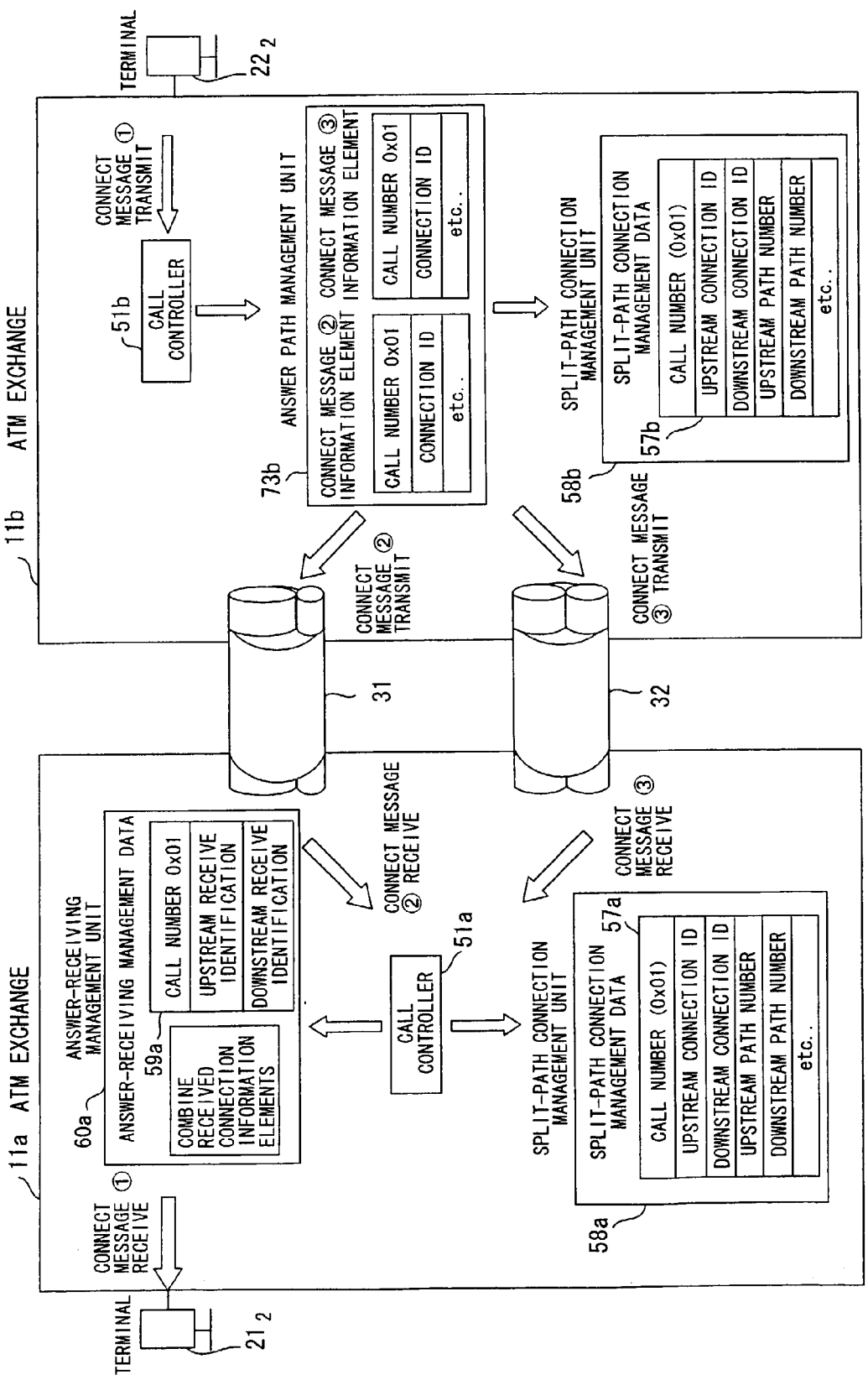
FIG. 27 is a diagram useful in describing control for sending and receiving an answer message.

FIG. 27 is a diagram useful in describing control for sending and receiving answer messages.

The terminal $22_2$, which has received the setup message ①, transmits an answer message (connect message ①. The call controller 51b of the called node 11b that has received the connect message ① notifies the answer path management unit 73b of receipt of the connect message ①. Upon being so notified, the answer path management unit 73b compiles a connect message ② for the upstream bandwidth and a connect message ③ for the downstream bandwidth using the split-path connection management data and transmits these to the upstream path 31 and downstream path 32 that received the setup messages ②, ③, respectively.

Upon receiving the connect message ② and the connect message ③ from the paths 31, 32, the call controller 51a of the calling node 11a queries the split-path connection management unit 58a as to whether the messages are connect messages of a split-path call. If the messages are connect messages of a split-path call, then the call controller 51a reports this to the answer-receiving management unit 60a.

Upon being so notified, the answer-receiving management unit 60a manages receipt of the upstream/downstream answer messages in accordance with the call number and, when both answers are received, combines the received connect message ② for the upstream bandwidth and the received connect message ③ for the downstream bandwidth, thereby generating bidirectional connect message ①, and reports this to the terminal $21_2$.

(c) Control for Sending and Receiving Release Message

Figure 28:
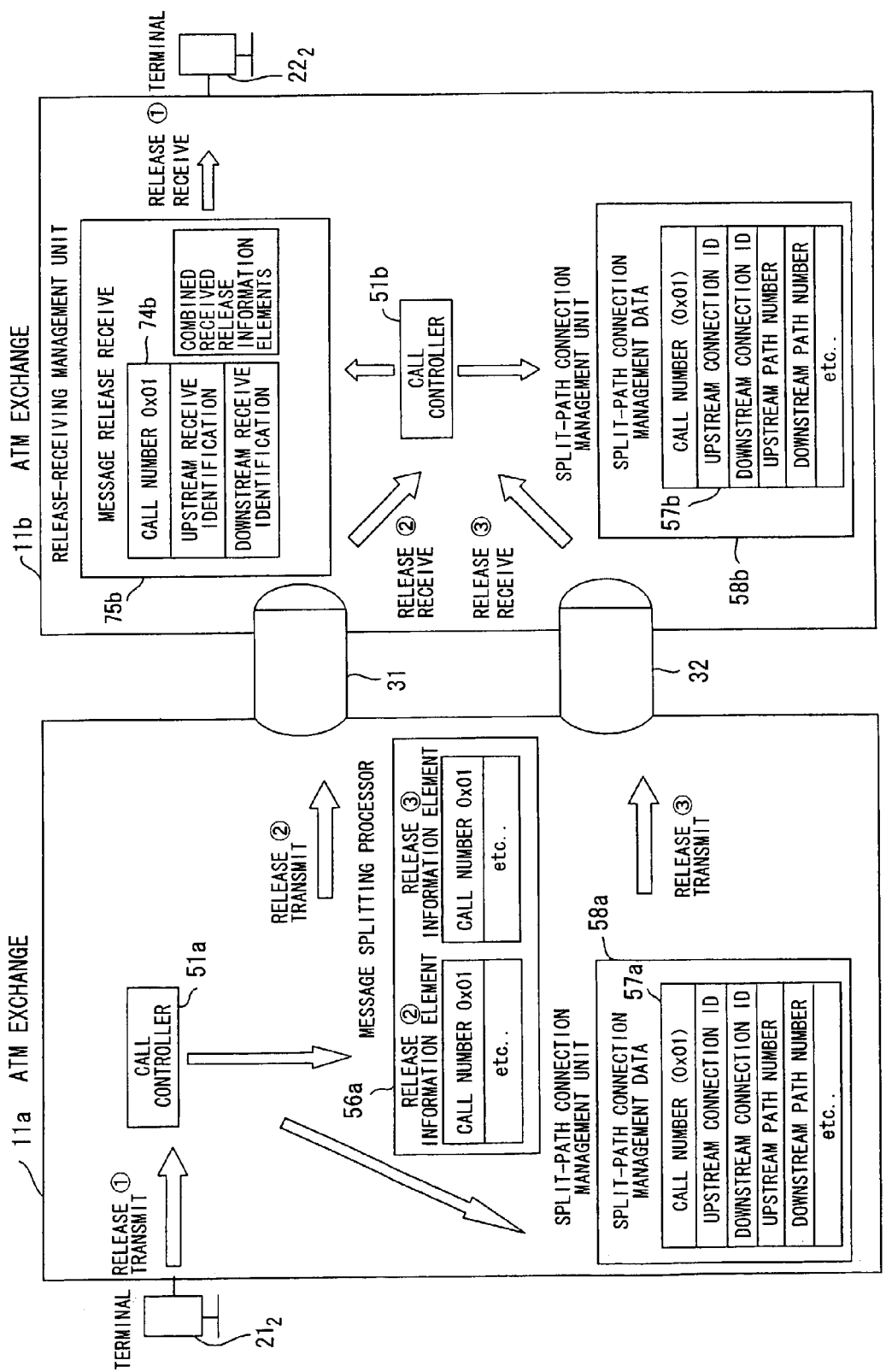
FIG. 28 is a diagram useful in describing control for sending and receiving a release message of a split-path call.

FIG. 28 is a diagram useful in describing control for sending and receiving a release message of a split-path call.

Upon receiving a release message (release message ①) transmitted from the terminal $21_2$, the call controller 51a queries the split-path connection management unit 58a as to whether the release message ① relates to a split-path call. The split-path connection management unit 58a determines whether split-path connection management data having a call number (0x01) that matches the call number included in the release message ①exists and, if such data exists, reports this split-path connection management data to the call controller 51a.

If the release message ① relates to a split-path call, then the call controller 51a instructs the message splitting processor 56a to send a release message to the upstream/downstream paths. In response, the message splitting processor 56a transmits a release message ② for the upstream bandwidth and a release message ③ for the downstream bandwidth to the connection-destination paths (paths 31 and 32), respectively, of the split-path call.

Upon receiving the release messages ②, ③ from the paths 31, 32, the call controller 51b of the called node 11b queries the split-path connection management unit 58b as to whether the release messages ②, ③ relate to a split-path call. If the release messages ②, ③ relate to a split-path call, then the release receiving management unit 75b is notified of receipt of release messages of the split-path call.

The release receiving management unit 75b manages receipt of release messages for the upstream and downstream bandwidths in accordance with the call number and, upon receiving both messages, compiles the received release messages ②, ③ for the upstream and downstream bandwidths to thereby generate the release message ① for both directions, and reports this to the terminal $22_2$.

(d) Control When Failure Occurs

Figure 29:
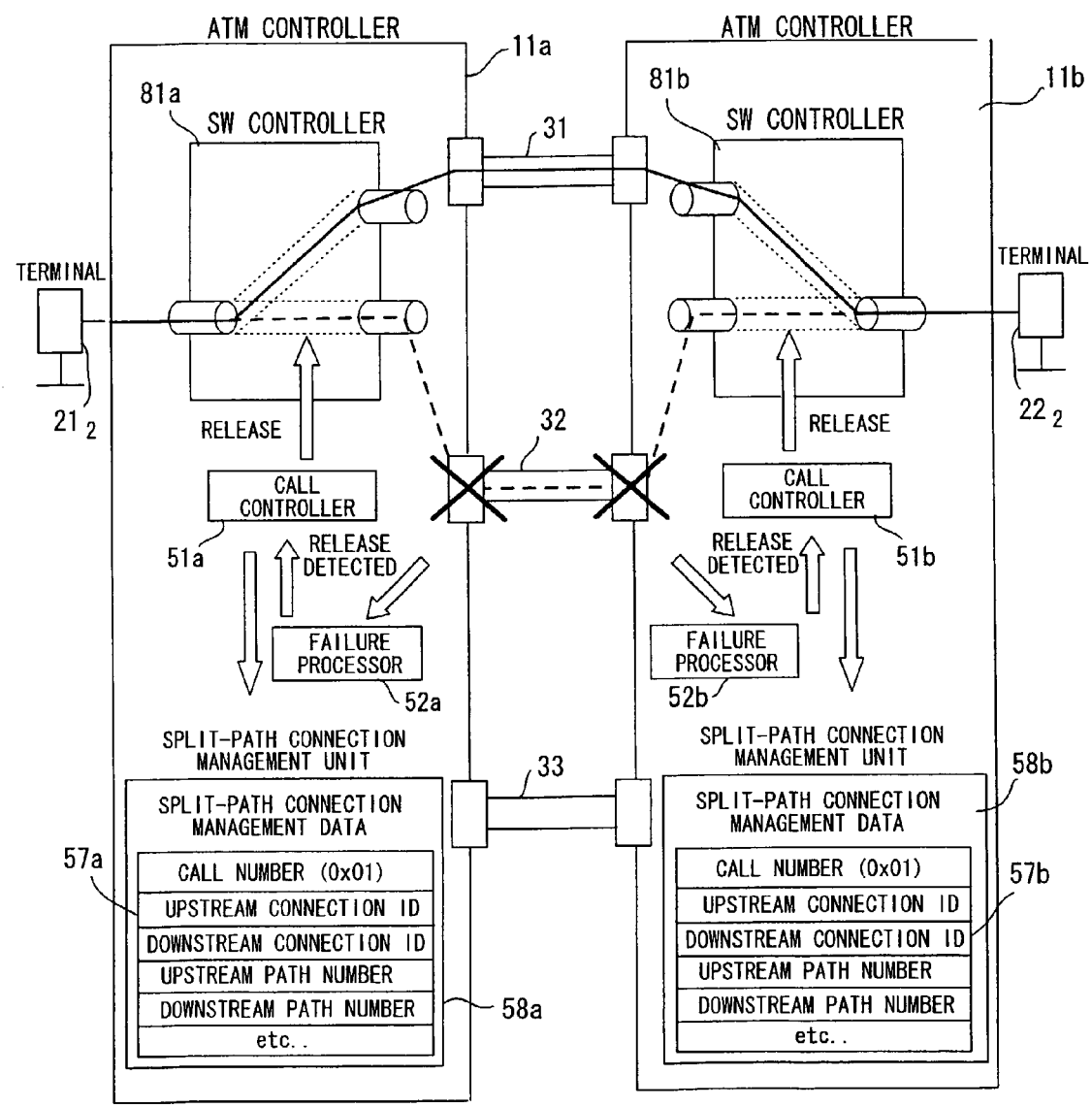
FIG. 29 is a first control explanatory view in a case where a path failure has occurred.
Figure 30:
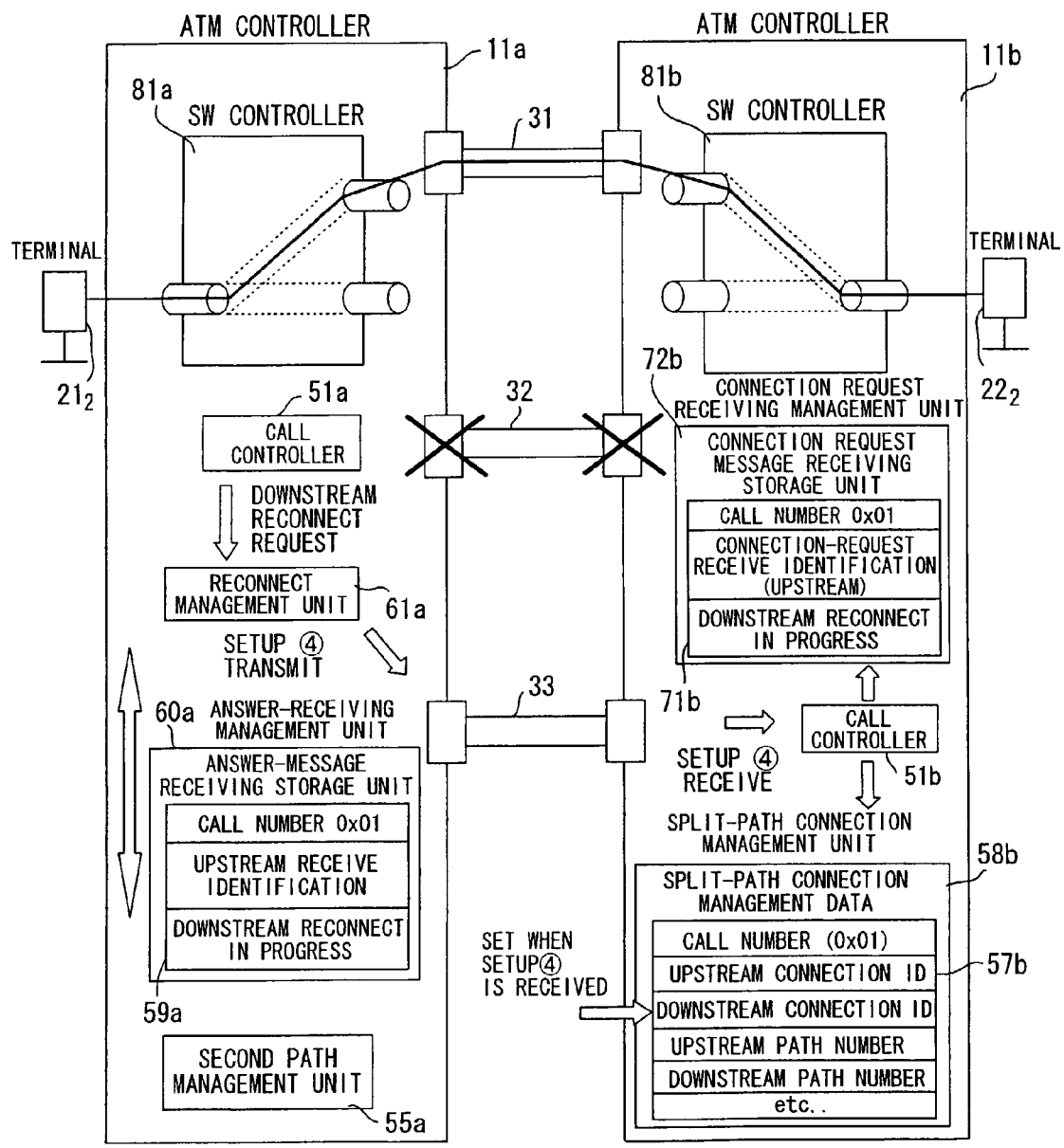
FIG. 30 is a second control explanatory view in a case where a path failure has occurred.
Figure 31:
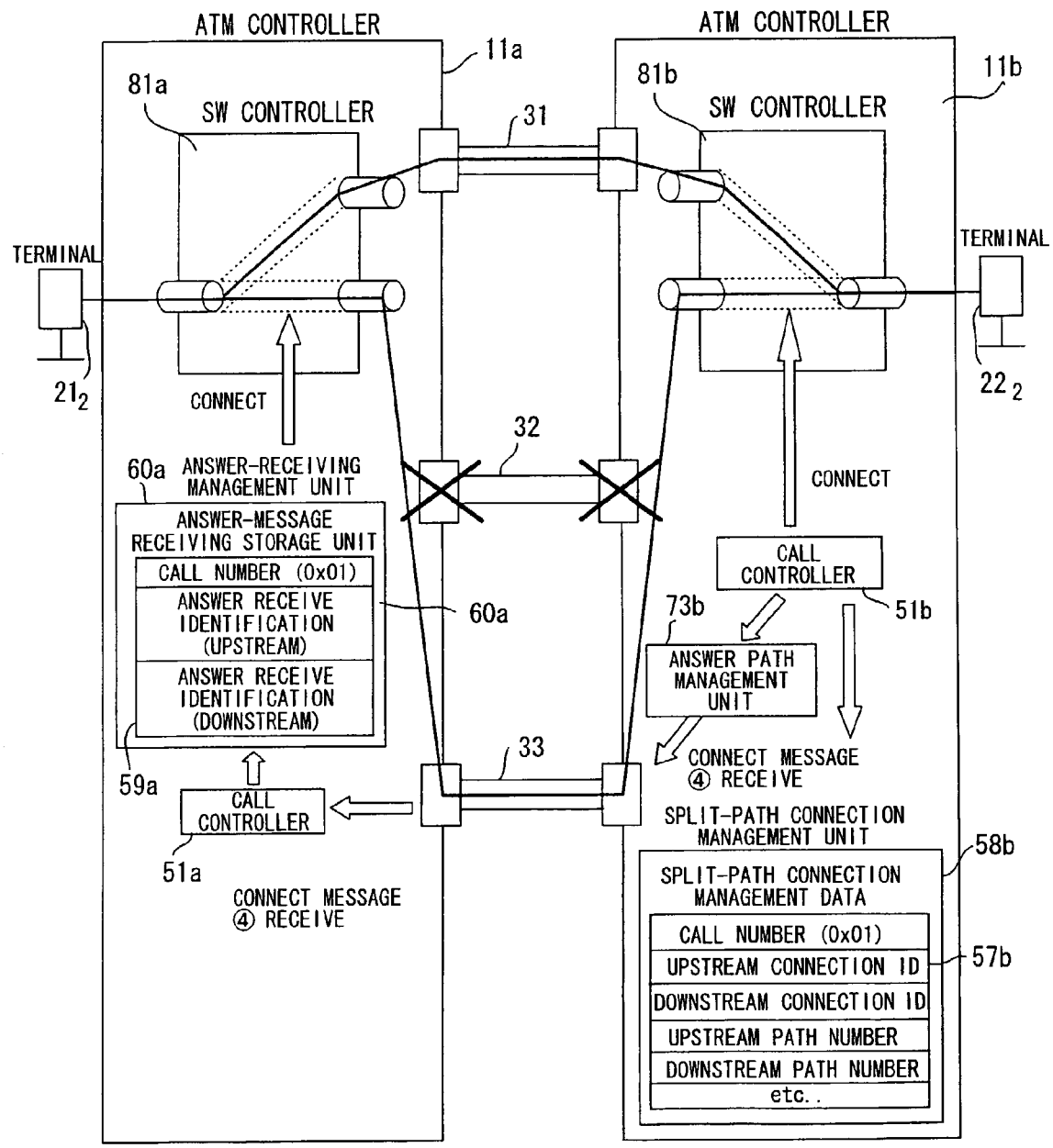
FIG. 31 is a third control explanatory view in a case where a path failure has occurred.
Figure 32:
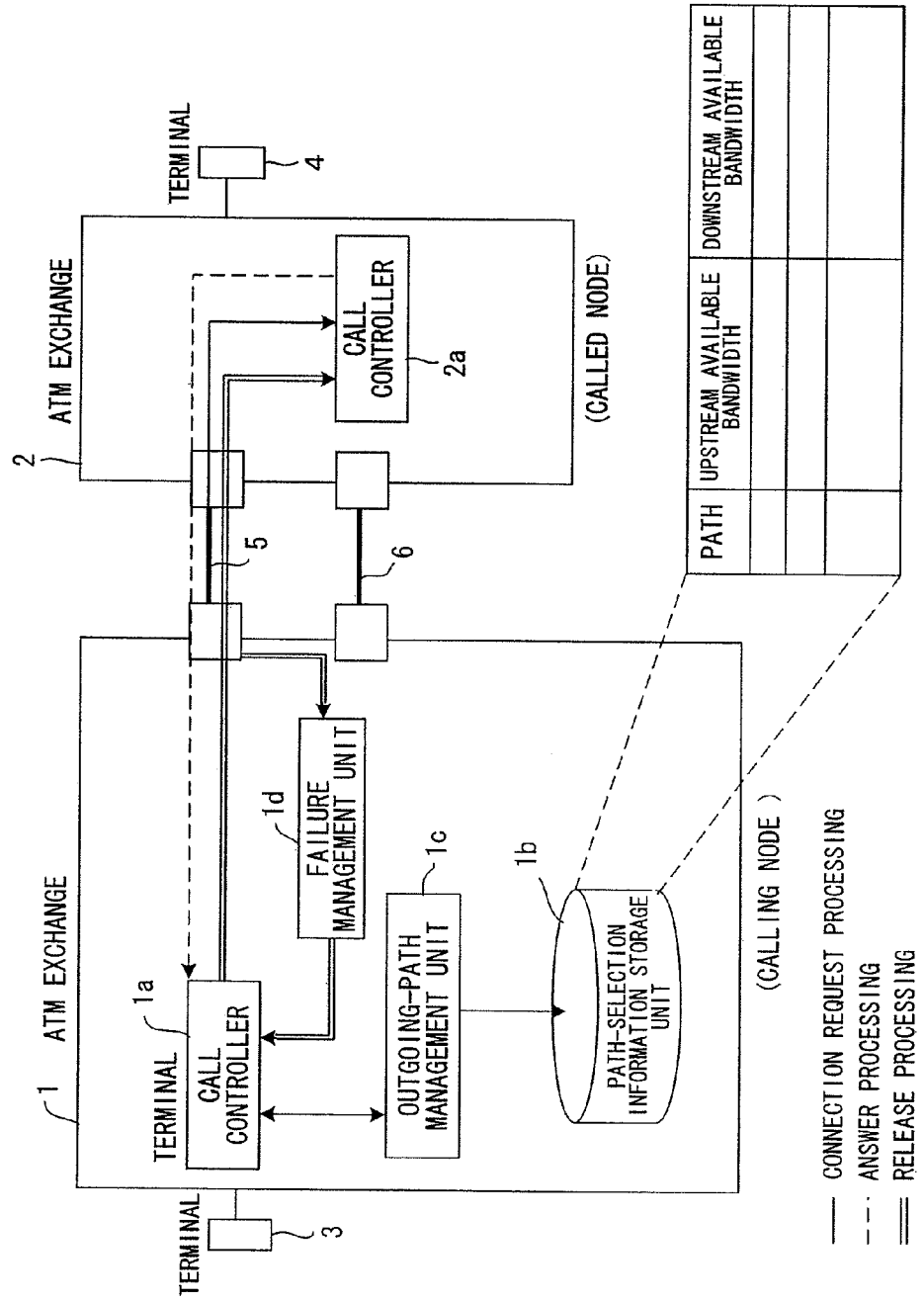
FIG. 32 is a diagram useful in describing a bidirectional connection request according to the prior art.
Figure 33:
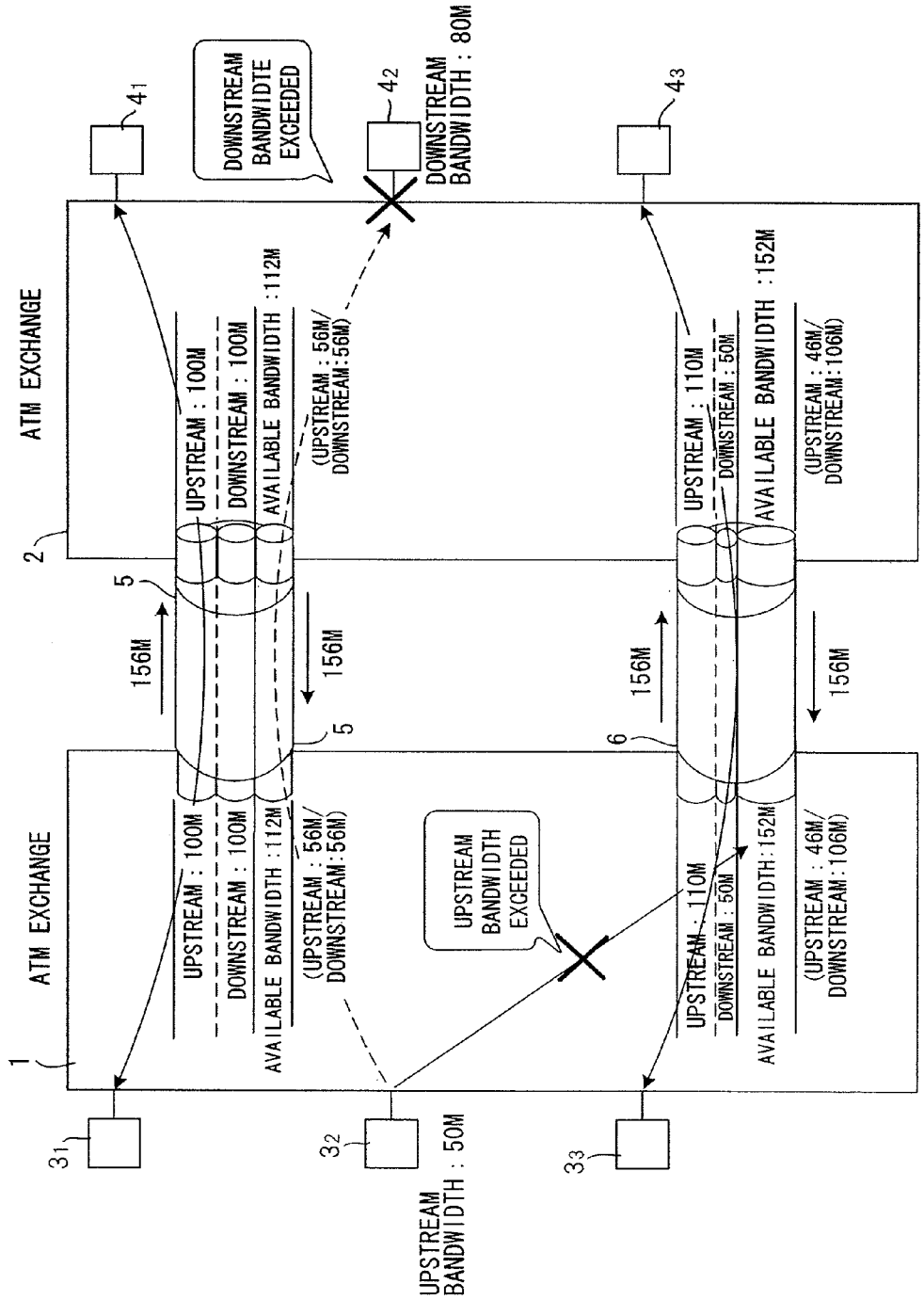
FIG. 33 is a diagram useful in describing the operation of the prior art.

FIGS. 29 to 31 are diagrams useful in describing control from release to reconnection in a case where a failure has occurred in one of the upstream/downstream paths allocated to a split-path call.

When a failure occurs on path 32 allocated for the downstream bandwidth, the failure management units 52a, 52b of the calling node 11a and called node 11b detect occurrence of the failure and request the call controllers 51a, 51b to request release of all connections existing on this path. Upon receiving the request, the call controllers 51a, 51b query the split-path connection management units 58a, 58b as to whether a split-path call allocated to path 32 exists. If the split-path call does exist, then the call controllers 51a, 51b request the switch controllers 81a, 81b to release the path on the trunk side (e.g., the path in the downstream direction), thereby releasing the path.

The call controller 51a of the calling node 11a at which path release has been completed sets "downstream reconnect in progress" in the answer-message receiving storage unit 59a (FIG. 30), and the call controller 51b of the called node 11b sets "downstream reconnect in progress" in the answer-message receiving storage unit 71b. Next, the call controller 51a of the called node requests the reconnect management unit 61a to reconnected the released connection. Upon receiving the request, the reconnect management unit 61a queries the second path management unit 55a with regard to a connectable path. If the connectable path 33 exists, the reconnect management unit 61a creates reconnect setup message ④ and transmits this message to the called node 11b.

When the call controller 51b receives the setup message ④ for reconnect, the call controller 51b sets the receive path number in the split-path connection management data storage unit 57b in association with the call number 0x01 via the split-path connection management unit 58b and then notifies the connection request receiving management unit 72b of receipt of the setup message ④. Upon being so notified, the connection request receiving management unit 72b determines, from the stored content of the connection request message receiving storage unit 71b, whether the setup message ④ is a reconnect setup message and reports the result to the call controller 51b.

As a result, the call controller 51b controls the switch controller 81b to connect the downstream path (the path between terminal $22_2$ and path 33) and immediately requests the answer path management unit 73b (FIG. 31) to transmit a connect message. Upon receiving the request, the answer path management unit 73b identifies the path 33, which has received the setup message ④, based upon the split-path connection management data and transmits the connect message ④ to this path.

The call controller 51a of the calling node 11a that has received the connect message ④ for reconnect notifies the answer-receiving management unit 60a of receipt of the connect message. Upon being so notified, the answer-receiving management unit 60a, based upon the data stored in the answer-message receiving storage unit 59a, recognizes that this connect message is one in response to a reconnect setup message, and controls the switch controller 81a so as to connect the terminal $21_2$ and the path 33. As a result of the foregoing, reconnect processing in response to occurrence of failure is completed.

In accordance with the present invention, it is possible to reduce cost, such as that incurred by adding on lines, by making effective utilization of the bandwidth of a path (line) connecting nodes.

Further, in networks that will grow increasing diverse in the future, it can be expected that the bandwidth information relating to connections will become more specialized depending upon the particular application. The present invention will make it possible to deal flexibly with design of such networks.

What is claimed is:

1. A call processing method at a communication node for accepting a call connection request that includes reported bandwidths in both upstream and downstream directions, comprising:

managing available bandwidths in both upstream and downstream directions on a per-trunk circuit basis wherein each trunk circuit connects between two nodes and has an upstream path and a downstream path;

when a call connection request that includes reported bandwidths in both upstream and downstream directions has been issued, searching for a trunk circuit having an upstream path of which upstream available bandwidth is greater than said upstream reported bandwidth and having a downstream path of which downstream available bandwidth is greater than said downstream reported bandwidth;

if such a trunk circuit can be found, accepting the call connection request as a call communicated in both directions on said trunk circuit;

if such a trunk circuit cannot be found, searching independently for one trunk circuit of which an upstream available bandwidth is greater than the upstream reported bandwidth and another trunk circuit connecting on a same leg between the two nodes of which a downstream available bandwidth is greater than the downstream reported bandwidth; and if these two trunk circuits can be found, accepting the call connection request as a split-path call communicated on separate trunk circuits on a per-upstream-, downstream-direction basis.

2. A call processing method according to claim 1, further comprising:

creating a call connection request message, which is transmitted from a calling node to a called node, for each of upstream and downstream trunk circuits;

transmitting each of the call connection request messages from the calling node to the called node via said upstream trunk circuit and said downstream trunk circuit; and at the called node, creating a call connection request message, which is reported to a destination terminal, when a call connection request message has been received at the called node from each trunk circuit.

3. A call processing method according to claim 2, further comprising:

incorporating an identical call number as well as split identifying data, which indicates that splitting has taken place, in each call connection request message transmitted from the calling node to the called node via each trunk circuit, wherein at the called node, said message creating step includes:
identifying that a received call connection request message is a call connection request message of a split-path call by referring to the split identifying data; and
when call connection request messages having the same call number are received from the upstream and downstream trunk circuits, creating a call connection request message reported to a destination terminal.

4. A call processing method according to claim 2, further comprising:

at the called node, creating an answer message, which is transmitted from the called node to the calling node, on a per-upstream- and downstream-trunk circuit basis, when an answer message has been received from the destination terminal in response to said reported call connection request message of a split-path call;

transmitting each of the answer messages from the called node to the calling node via said upstream trunk circuit and said downstream trunk circuit; and at the calling node, creating an answer message, which is reported to an originating terminal, when an answer message has been received from each trunk circuit.

5. A call processing method according to claim 4, further comprising:

at the calling node, saving the call number, an upstream trunk circuit number and a downstream trunk circuit number of said split-path call; and incorporating the call number of the split-path call in each answer message transmitted from the called node to the calling node, wherein at the calling node, said answer message creating step includes:
determining that a message is an answer message of a split-path call by comparing the call number of a received answer message and the saved call number of the split-path call; and
creating an answer message, which is reported to the originating terminal, when answer messages from two trunk circuits are received in which the saved call number matches the call number of the messages.

6. A call processing method according to claim 1, further comprising:

at the calling node or called node, creating a release request message, which is transmitted to the other node, on a per-upstream- and downstream-trunk circuit basis when a release request message has been received from a terminal; and at the other node, creating a release request message, which is reported to a terminal, when a release request message has been received from each trunk circuit.

7. A call processing method according to claim 6, further comprising:

at the other node, saving the call number, an upstream trunk circuit number and a downstream trunk circuit number of said split-path call; and incorporating the call number of the split-path call in each release request message transmitted from the one node to the other node via each trunk circuit, wherein at the other node, said release request message creating step includes:
determining that a message is a release request message of a split-path call by comparing the call number of a received release request message and the saved call number of the split-path call; and
creating a release request message, which is reported to a terminal, when release request messages having said call number have been received from two trunk circuits.

8. A call processing method according to claim 1, further comprising:

when a failure occurs on an upstream trunk circuit or downstream trunk circuit during communication on separate trunk circuits on a per-upstream-, downstream-direction basis, releasing a connection on the trunk circuit where the failure occurred;

subsequently searching for a separate trunk circuit having an available bandwidth that is greater than a reported bandwidth that has been allocated to the released trunk circuit;

if such a trunk circuit can be found, creating a reconnect call-connection request message and transmitting the message from a calling node to a called node via said separate trunk circuit;

at the called node, setting up a path between said separate trunk circuit and a destination terminal and transmitting an answer message to a calling node when the reconnect call-connection request message has been received; and at the calling node, setting up a path between an originating terminal and said separate trunk circuit in response to receipt of the answer message.

* * * * *